United States Patent
Yang et al.

(10) Patent No.: US 12,539,284 B2
(45) Date of Patent: Feb. 3, 2026

(54) AMINOXY ACID-BASED ANTI-CANCER STEM CELL COMPOUNDS AND METHODS THEREOF

(71) Applicant: Westlake University, Zhejiang (CN)

(72) Inventors: Dan Yang, Zhejiang (CN); Fangfang Shen, Palo Alto, CA (US)

(73) Assignee: Westlake University, Zhejiang (CN)

( * ) Notice: Subject to any disclaimer, the term of this patent is extended or adjusted under 35 U.S.C. 154(b) by 886 days.

(21) Appl. No.: 17/779,379

(22) PCT Filed: Nov. 23, 2020

(86) PCT No.: PCT/CN2020/130792
§ 371 (c)(1),
(2) Date: May 24, 2022

(87) PCT Pub. No.: WO2021/104199
PCT Pub. Date: Jun. 3, 2021

(65) Prior Publication Data
US 2023/0301944 A1 Sep. 28, 2023

Related U.S. Application Data

(60) Provisional application No. 62/940,601, filed on Nov. 26, 2019, provisional application No. 62/939,803, filed on Nov. 25, 2019.

(51) Int. Cl.
*A61K 31/166* (2006.01)
*A61K 31/404* (2006.01)
*A61K 45/06* (2006.01)
*A61P 35/00* (2006.01)

(52) U.S. Cl.
CPC .......... *A61K 31/166* (2013.01); *A61K 31/404* (2013.01); *A61K 45/06* (2013.01); *A61P 35/00* (2018.01)

(58) Field of Classification Search
CPC .............. A61K 2300/00; A61K 31/166; A61K 31/404; A61K 45/06; A61P 35/00; C07C 259/10; C07D 209/12
See application file for complete search history.

(56) References Cited

U.S. PATENT DOCUMENTS

2024/0315992 A1* 9/2024 Yang .................... C07D 239/42

FOREIGN PATENT DOCUMENTS

| CN | 108366987 A | 8/2018 |
| WO | 2006/104751 A2 | 10/2006 |
| WO | 2016/176675 A2 | 11/2016 |

OTHER PUBLICATIONS

Cecil Textbook of Medicine, 20th Ed., vol. 1 (Year: 1997).*
Wu et al. Small-molecule inhibitors, immune checkpoint inhibitors, and more: FDA-approved novel therapeutic drugs for solid tumors from 1991 to 2021; Journal of Hematology & Oncology, 15, 143 (Year: 2022).*
Fangfang, S. "Design and Synthesis of a-Aminoxy Acid-Based Cation Transporters and Their Applications as Anti-Cancer and Antibacterial Agents," Doctoral Thesis, The University of Hong Kong (Year: 2018).*
International Search Report dated Feb. 24, 2021 issued in PCT/CN2020/130792.
Shen, F.F. et al. "Mediating K+/H+ Transport on Organelle Membranes to Selectively Eradicate Cancer Stem Cells with a Small Molecule", Journal of the American Chemical Society (May 22, 2020), vol. 142, No. 24, pp. 10769-10779.
"RN 2319939-24-5", STN Registry, May 29, 2019, pp. 1-9.
Yang, D. et al., "Novel Turns and Helices in Peptides of Chiral a-Aminoxy Acids", Journal of the American Chemical Society (Jan. 9, 1999), vol. 121, No. 3, pp. 589-590.
Yang, D. et al., "Synthesis and Characterization of Chiral N—O Turns Induced by α-Aminoxy Acids", Journal of Organic Chemistry (Oct. 11, 2001), vol. 66, No. 22, pp. 7303-7312.
Chinese Office Action and Search Report dated Apr. 19, 2023 received in Chinese Application No. 202080081778.3, together with an English-language translation.
Blaser, R. et al., "Reaction of benzohydroxamic acid esters and diazomethane", Helvetica Chimica Acta (Dec. 31, 1969), vol. 52, No. 3, pp. 569-576.

* cited by examiner

*Primary Examiner* — Jeffrey H Murray
*Assistant Examiner* — Daniel John Burkett
(74) *Attorney, Agent, or Firm* — Scully, Scott, Murphy & Presser, P.C.

(57) ABSTRACT

The disclosed invention is generally in the field of synthetic small molecules and their use as drug, in particular in the treatment of cancer. Also provided is a method of inhibiting cancer stem cells. Also provided is a method for treatment of cancers and other diseases by affecting mitochondrial functions. Also provided is a method of making and using of the compounds.

9 Claims, 9 Drawing Sheets

AMINOXY ACID-BASED ANTI-CANCER STEM CELL COMPOUNDS AND METHODS THEREOF

1. FIELD OF THE INVENTION

The disclosed invention is generally in the field of synthetic small molecules and their use as drugs for cancer treatment.

2. BACKGROUND OF THE INVENTION

Tumors are heterogenous. The bulk tumor contains a diverse collection of cells with distinct features including metabolism, antigen expression and gene expression that result in their different levels of sensitivity to treatment (Meacham et al., Nature 501:328-337 (2013)). Cancer stem cells (CSCs) are a minor population of cells within tumors that show self-renewal and tumor initiating capability (Reya et al., Nature 414:105-111 (2001)). They are resistant to conventional chemotherapies and radiotherapies, which lead to tumor metastasis and relapse (Baumann et al., Nat. Rev. Cancer 8:545-554 (2008)). It is expected that selective elimination of CSCs could greatly improve therapeutic effects of current anti-cancer treatments (Dingli et al., Stem Cells 24:2603-2610 (2006)).

The first CSCs inhibitor salinomycin was identified in a high-throughput screen of 16,000 compounds on breast CSCs (Gupta et al., Cell 138:645-659 (2009)). Flow-up studies reported that salinomycin are effective on various types of cancer cells. The abilities of salinomycin to induce mitophagy, deplete cell ATP levels and inhibit Wnt/β-catenin signaling pathway have been associated with its toxicity against CSCs. However, recently, it was disclosed that side population of ovarian cancer cells could escape the toxicity of salinomycin due to the higher expression of ABC drug transporter systems, which might limit the potential of salinomycin as anti-cancer drugs (Boesch et al. Oncologist 21:1291-1293 (2016)). Besides salinomycin, other molecules, including tigecycline, doxycycline, niclosamide and artesunate, were also identified as inhibitors of CSCs in other independent screens (Francesco et al., Biochemical Journal 475:1611-1634 (2018)). All of them could also inhibit mitochondria respiration.

It was reported that the metabolism of CSCs is distinct from non-CSCs. Due to the Warburg effects, differentiated tumor cells mainly rely on glycolysis, but CSCs, can be highly glycolytic or OXPHOS dependent. In either case, mitochondria play critical roles in CSC functionality (Sancho et al., Cancer 114:1305-1312 (2016)). Increased mitochondria mass, hyperpolarized mitochondria membrane potential and higher antioxidant levels are reported to be associated with the stemness of CSCs (Kim et al., Semin. Cancer Biol. 47:154-167 (2017)). These discoveries explained why mitochondria targeting compounds could be effective against CSCs.

Some of the above-mentioned compounds have been studied pre-clinically or reported entered clinical trials, but up to now, no further encouraging results have been reported. Thus, it is much needed to discover and develop new molecules to target CSCs.

3. BRIEF SUMMARY OF THE INVENTION

Disclosed are compounds, compositions, and methods for targeting cancers. Also disclosed are compounds, compositions, and methods for targeting cancers by eliminating cancer stem cells. Also disclosed are compounds, compositions, and methods for targeting cancer stem cells. Also disclosed are compounds, compositions, and methods for targeting cancer stem cells and other diseases through mitochondria. Also disclosed are compounds, compositions, and methods for targeting cancer stem cells through modulating mitochondrial membrane potential, mitochondrial reactive oxygen species production, cell respiration, apoptosis and autophagy. The compounds are synthetic, small molecules that can induce the death of cancer stem cells and cancer cells. In certain embodiments, the compounds are selective for one or more types of cancer stem cells, such as ovarian cancer stem cells.

Provided herein is a compound that can induce cell death having formula I:

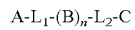

Formula I, wherein A is substituted or unsubstituted aryl, substituted or unsubstituted heteroaryl, substituted or unsubstituted polyaryl, substituted or unsubstituted polyheteroaryl, substituted or unsubstituted aralkyl, substituted or unsubstituted heteroaralkyl, substituted or unsubstituted polyaralkyl, substituted or unsubstituted polyheteroaralkyl, substituted or unsubstituted alkyl, substituted or unsubstituted alkenyl, substituted or unsubstituted alkynyl, substituted or unsubstituted $C_3$-$C_{20}$ cycloalkyl, or substituted or unsubstituted $C_3$-$C_{20}$ heterocyclyl; wherein each B independently has the structure:

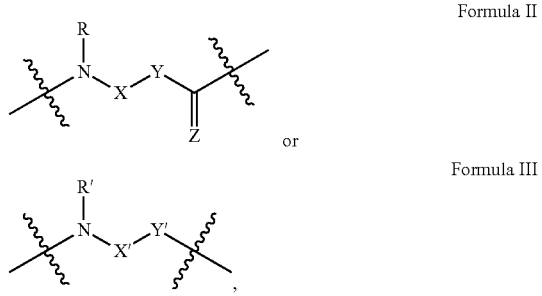

wherein X, X', and X" are independently O, absent, S, $NR_2$, substituted or unsubstituted alkyl, substituted or unsubstituted alkylene, or substituted or unsubstituted $C_3$-$C_{20}$ heterocycyl, substituted or unsubstituted alkenyl, substituted or unsubstituted alkynyl, substituted or unsubstituted alkoxyalkyl, substituted or unsubstituted heteroalkyl, substituted or unsubstituted $C_3$-$C_{20}$ cycloalkyl, substituted or unsubstituted $C_3$-$C_{20}$ cycloalkenyl, substituted or unsubstituted $C_3$-$C_{20}$ cycloalkynyl, substituted or unsubstituted aminoalkyl, substituted or unsubstituted aryl, substituted or unsubstituted alkaryl, substituted or unsubstituted aralkyl; wherein Y, Y', and Y" are independently substituted or unsubstituted alkyl, absent, O, S, $NR_3$, substituted or unsubstituted alkylene, substituted or unsubstituted aryl, substituted or unsubstituted heteroaryl, substituted or unsubstituted polyaryl, substituted or unsubstituted polyheteroaryl, substituted or unsubstituted aralkyl, substituted or unsubstituted heteroaralkyl, substituted or unsubstituted heteroaralkyl, substituted or unsubstituted polyaralkyl, substituted or unsubstituted polyheteroaralkyl, substituted or unsubstituted $C_3$-$C_{20}$ cycloalkyl, substituted or unsubstituted $C_3$-$C_{20}$cycloalkenyl, substituted or unsubstituted $C_3$-$C_{20}$ cycloalkynyl, substituted or unsubstituted $C_3$-$C_{20}$ heterocycyl, or substituted or unsubstituted aminoalkyl; wherein Z is O, S, or $NR_4$; wherein $L_1$ and $L_2$ are independently —OC(O)—, —C(O)—, —S(O)$_2$—, —O—, absent, —C(O)O—, —S(O)—, —C(O)NH—, —C(O)$NR^{iv}$—, —$NR^{iv}$C(O)—, —C(O)$OCH_2$—, —$SO_2NR^{iv}$—, —$CH_2R^{iv}$—, —$NR^{iv}$H—, —$NR^{iv}$—, —OCONH—, —NHCOO—, —OCON$R^{iv}$—, —$NR^{iv}$COO—, —NHCONH—, —$NR^{iv}$CONH—, —NHCON$R^{iv}$—, —$NR^{iv}$CON$R^{iv}$—, —CHOH—, —$CR^{iv}$OH—, substituted or unsubstituted alkyl, substituted or unsubstituted alkylene, substituted or unsubstituted alkenyl, substituted or unsubstituted alkylamino, substituted or unsubstituted alkynyl, substituted or unsubstituted alkoxyalkyl, substituted or unsubstituted heteroalkyl, substituted or unsubstituted $C_3$-$C_{20}$ cycloalkyl, substituted or unsubstituted $C_3$-$C_{20}$ cycloalkenyl, substituted or unsubstituted $C_3$-$C_{20}$ cycloalkynyl, substituted or unsubstituted $C_3$-$C_{20}$ heterocyclyl, substituted or unsubstituted aminoalkyl, substituted or unsubstituted aryl, substituted or unsubstituted alkaryl, substituted or unsubstituted arylalkyl, substituted or unsubstituted carboxyalkyl, substituted or unsubstituted alkoxycarbonyl, substituted or unsubstituted acyl, or substituted or unsubstituted aminocarbonyl; wherein $R_1$, $R_2$, $R_3$, $R_4$, $R_5$, R, R', R", R''', and $R^{iv}$ are independently hydrogen, substituted or unsubstituted alkyl, substituted or unsubstituted alkenyl, substituted or unsubstituted alkynyl, substituted or unsubstituted alkoxyalkyl, substituted or unsubstituted heteroalkyl, substituted or unsubstituted $C_3$-$C_{20}$ cycloalkyl, substituted or unsubstituted $C_3$-$C_{20}$ cycloalkenyl, substituted or unsubstituted $C_3$-$C_{20}$ cycloalkynyl, substituted or unsubstituted $C_3$-$C_{20}$ heterocyclyl, substituted or unsubstituted aminoalkyl, substituted or unsubstituted aryl, substituted or unsubstituted alkaryl, substituted or unsubstituted aralkyl, or substituted or unsubstituted acyl; wherein C is substituted or unsubstituted aryl, substituted or unsubstituted heteroaryl, substituted or unsubstituted polyaryl, substituted or unsubstituted polyheteroaryl, substituted or unsubstituted aralkyl, substituted or unsubstituted heteroaralkyl, substituted or unsubstituted polyaralkyl, substituted or unsubstituted polyheteroaralkyl, substituted or unsubstituted alkyl, substituted or unsubstituted alkenyl, substituted or unsubstituted alkynyl, substituted or unsubstituted $C_3$-$C_{20}$ cycloalkyl, substituted or unsubstituted $C_3$-$C_{20}$ cycloalkenyl, substituted or unsubstituted $C_3$-$C_{20}$ cycloalkynyl, unsubstituted or substituted $C_3$-$C_{20}$ heterocyclyl, substituted or unsubstituted aminoalkyl, substituted or unsubstituted alkaryl, substituted or unsubstituted carboxyalkyl, substituted or unsubstituted alkoxycarbonyl, substituted or unsubstituted acyl, or substituted or unsubstituted aminocarbonyl, or H; and wherein n is an integer from 1 to 5.

In certain embodiments, A is substituted or unsubstituted aryl, substituted or unsubstituted heteroaryl, substituted or unsubstituted polyaryl, substituted or unsubstituted polyheteroaryl, substituted or unsubstituted aralkyl, substituted or unsubstituted heteroaralkyl, substituted or unsubstituted polyaralkyl, substituted or unsubstituted polyheteroaralkyl, or substituted or unsubstituted alkyl; and $L_1$ is —OC(O)—, —C(O)—, or —S(O)$_2$—.

In certain embodiments, A is a substituted or unsubstituted aryl, substituted or unsubstituted aralkyl, or substituted or unsubstituted alkyl, having the formula $(R_7-)_a$(aryl), $(R_7-)_a$(aralkyl), or $(R_7-)_a$(alkyl), respectively, wherein each $R_7$ is independently $F_3C$—, F—, Cl—, $O_2N$—, NC—, MeO—, HO—, HC(O)—, $(R_8)_2N$—, wherein each $R_8$ is independently H, substituted or unsubstituted alkyl, substituted or unsubstituted alkenyl, substituted or unsubstituted alkynyl, substituted or unsubstituted alkoxyalkyl, substituted or unsubstituted heteroalkyl, substituted or unsubstituted $C_3$-$C_{20}$ cycloalkyl, substituted or unsubstituted $C_3$-$C_{20}$ cycloalkenyl, substituted or unsubstituted $C_3$-$C_{20}$ cycloalkynyl, substituted or unsubstituted $C_3$-$C_{20}$ heterocyclyl, substituted or unsubstituted aminoalkyl, substituted or unsubstituted aryl, substituted or unsubstituted alkaryl, substituted or unsubstituted aralkyl, or substituted or unsubstituted acyl, and wherein a is 0, 1, 2, or 3.

In certain embodiments, A comprises an electron withdrawing group.

In certain embodiments, the electron withdrawing group is $CF_3$, $NO_2$, F, Cl, Br, I, CN, CHO, or substituted or unsubstituted carbonyl, sulfonyl, trifluoroacetyl, or trifluoromethyl sulfonyl.

In certain embodiments, A is unsubstituted or substituted $C_{1-18}$ alkyl, substituted or unsubstituted aryl, or substituted or unsubstituted aralkyl, wherein the substituted $C_{1-18}$ alkyl, substituted aryl, or substituted aralkyl comprises an oxygen-, nitrogen-, or sulfur-containing moiety.

In certain embodiments, $L_1$ and $L_2$ are selected such that at least one of the atoms adjacent to B is oxygen, nitrogen, or sulfur.

In certain embodiments, X is substituted or unsubstituted heterocyclyl, wherein the heterocyclyl is optionally substituted with an oxygen-, nitrogen-, or sulfur-containing moiety, or an electron withdrawing group.

In certain embodiments, the electron withdrawing group is $CF_3$, $NO_2$, F, Cl, Br, I, CN, or CHO.

In certain embodiments, each Y, Y', or Y" is independently substituted or unsubstituted $C_{1-10}$ alkyl, substituted or unsubstituted aralkyl, wherein the substituted alkyl or substituted aralkyl comprises an oxygen-, nitrogen-, or sulfur-containing moiety, or an electron withdrawing group.

In certain embodiments, the electron withdrawing group is $CF_3$, $NO_2$, F, Cl, Br, I, CN, or CHO.

In certain embodiments, $L_2$ is $NR_{10}$, O, S, or absent, wherein $R_{10}$ is H, substituted or unsubstituted alkyl, substituted or unsubstituted alkenyl, substituted or unsubstituted alkynyl, substituted or unsubstituted alkoxyalkyl, substituted or unsubstituted heteroalkyl, substituted or unsubstituted $C_3$-$C_{20}$ cycloalkyl, substituted or unsubstituted $C_3$-$C_{20}$ cycloalkenyl, substituted or unsubstituted $C_3$-$C_{20}$ cycloalkynyl, substituted or unsubstituted $C_3$-$C_{20}$ heterocyclyl, substituted or unsubstituted aminoalkyl, substituted or unsubstituted aryl, substituted or unsubstituted alkaryl, substituted or unsubstituted arylalkyl, substituted or unsubstituted carboxyalkyl, substituted or unsubstituted alkoxycarbonyl, substituted or unsubstituted acyl, or substituted or unsubstituted aminocarbonyl, wherein C is H, substituted or unsubstituted alkyl, substituted or unsubstituted alkenyl, substituted or unsubstituted alkynyl, substituted or unsubstituted alkoxyalkyl, substituted or unsubstituted heteroalkyl, substituted or unsubstituted $C_3$-$C_{20}$ cycloalkyl, substituted or unsubstituted $C_3$-$C_{20}$ cycloalkenyl, substituted or unsubstituted $C_3$-$C_{20}$ cycloalkynyl, substituted or unsubstituted $C_3$-$C_{20}$ heterocyclyl, aminoalkyl, substituted or unsubstituted aryl, substituted or unsubstituted alkaryl, substituted or unsubstituted $C_3$-$C_{20}$ aralkyl, substituted or unsubstituted carboxyalkyl, substituted or unsubstituted $C_3$-$C_{20}$ alkoxycarbonyl, substituted or unsubstituted $C_3$-$C_{20}$ acyl, or substituted or unsubstituted $C_3$-$C_{20}$ aminocarbonyl.

In certain embodiments, C is a substituted or unsubstituted aryl having the formula -(aryl)(—$R_{11}$)$_b$, —$R_{11}$, or —O—$R_{11}$, wherein each $R_{11}$ is independently —$CF_3$, —F, —Cl, —$NO_2$, —CN, —O-Me, —OH, —$NR_{12}$, wherein each $R_{12}$ is independently H, substituted or unsubstituted alkyl, substituted or unsubstituted alkenyl, substituted or unsubstituted alkynyl, substituted or unsubstituted alkoxyalkyl, substituted or unsubstituted heteroalkyl, substituted or unsubstituted $C_3$-$C_{20}$ cycloalkyl, substituted or unsubstituted $C_3$-$C_{20}$ cycloalkenyl, substituted or unsubstituted $C_3$-$C_{20}$ cycloalkynyl, substituted or unsubstituted $C_3$-$C_{20}$ heterocyclyl, substituted or unsubstituted aminoalkyl, substituted or unsubstituted aryl, substituted or unsubstituted alkaryl, substituted or unsubstituted arylalkyl, substituted or unsubstituted carboxyalkyl, substituted or unsubstituted alkoxycarbonyl, substituted or unsubstituted acyl, or substituted or unsubstituted aminocarbonyl, wherein b is 0, 1, 2, or 3.

In certain embodiments, B is

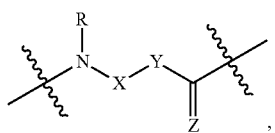

Formula IV wherein X is O or absent, wherein Y is —$CR_{13}R_{14}$—, wherein $R_{13}$ is —$CH_2$—$C_6H_5$, —$CH_2$—O—$C_6H_5$, —$C_{1-4}$ alkyl, or —O—$C_{1-4}$ alkyl, wherein $R_{14}$ is H, wherein Z is O; wherein n is 1; wherein A has the formula ($R_7$-$)_a$(phenyl)-, $L_1$ is —C(O)—, wherein a is 2, wherein each $R_7$ is $F_3C$—; wherein C is —$CH_2$—$C_6H_5$, —$CH_2$—O—$C_6H_5$, —$C_{1-4}$ alkyl, or —O—$C_{1-4}$ alkyl; and wherein $L_2$ is NH, O, or S.

In certain embodiments, B is

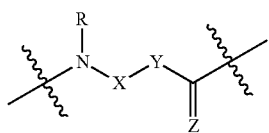

Formula IV wherein X is O or absent, wherein Y is —$CR_{13}R_{14}$—, wherein $R_{13}$ is —$CH_2$—$C_6H_5$, —$CH_2$—O—$C_6H_5$, —$C_{1-4}$ alkyl, —O—$C_{1-4}$ alkyl, —$CH_2$-(phenyl)(—$R_{15})_c$, —$CH_2$—O-(phenyl)(—$R_{15})_c$, —$C_{1-4}$ alkyl-$R_{15}$, or —O—$C_{1-4}$ alkyl-$R_{15}$, wherein $R_{14}$ is H, wherein each $R_{15}$ is independently —$CF_3$, —F, C—Cl, —$NO_2$, —CN, —O-Me, —OH, —NH, wherein c is 1 or 2, wherein Z is O; wherein n is 1; wherein A is ($R_7$-$)_a$(phenyl)-CO—, $C_6H_5$—$CH_2$—, $C_6H_5$—O—$CH_2$—, $C_{1-4}$ alkyl-, or $C_{1-4}$ alkyl-O—, wherein a is 2, wherein each $R_7$ is independently $F_3C$—, F—, Cl—, $O_2N$—, NC—, MeO—, HO—, HN—; $L_1$ is —C(O)— or absent; wherein C is —$CH_2$—$C_6H_5$, —$CH_2$—O— $C_6H_5$, —$C_{1-4}$ alkyl, —O—$C_{1-4}$ alkyl, —$CH_2$-(phenyl) (—$R_{16})_d$, —$CH_2$—O-(phenyl)(—$R_{16})_d$, —$C_{1-4}$ alkyl-$R_{16}$, or —O—$C_{1-4}$ alkyl-$R_{16}$, wherein each $R_{16}$ is independently —$CF_3$, —F, C—Cl, —$NO_2$, —CN, —O-Me, —OH, —NH, wherein d is 1 or 2; and wherein $L_2$ is NH, 0, or S.

Provided herein are compounds having the following structures:

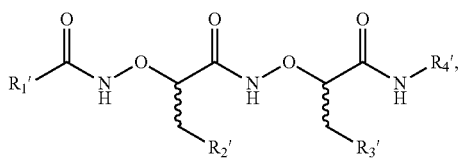

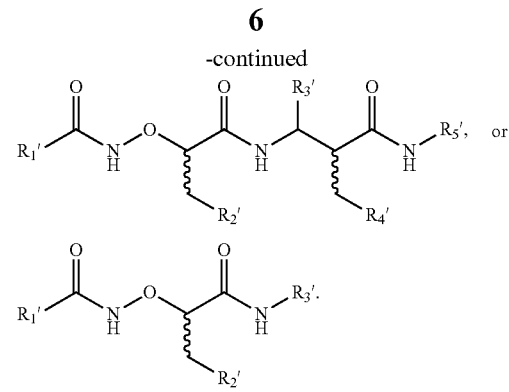

wherein each $R_1'$-$R_5'$ is independently H, substituted or unsubstituted alkyl, substituted or unsubstituted alkenyl, substituted or unsubstituted alkynyl, substituted or unsubstituted alkoxyalkyl, substituted or unsubstituted heteroalkyl, substituted or unsubstituted $C_3$-$C_{20}$ cycloalkyl, substituted or unsubstituted cycloalkenyl, substituted or unsubstituted $C_3$-$C_{20}$ cycloalkynyl, substituted or unsubstituted $C_3$-$C_{20}$ heterocyclyl, substituted or unsubstituted aminoalkyl, substituted or unsubstituted aryl, substituted or unsubstituted alkaryl, substituted or unsubstituted arylalkyl, substituted or unsubstituted carboxyalkyl, substituted or unsubstituted alkoxycarbonyl, substituted or unsubstituted acyl, or substituted or unsubstituted aminocarbonyl.

Provided herein is a cell death inducing compound selected from the group consisting of:

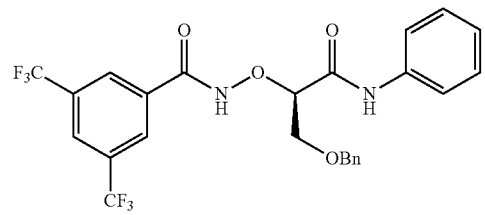

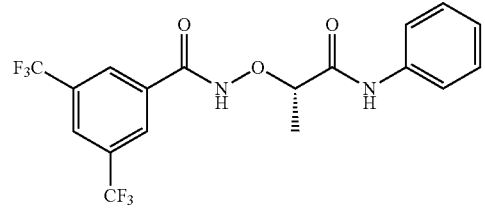

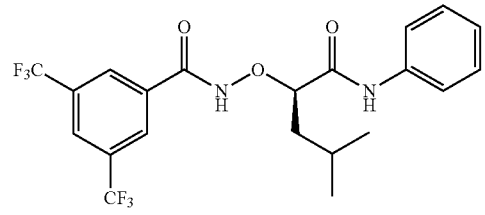

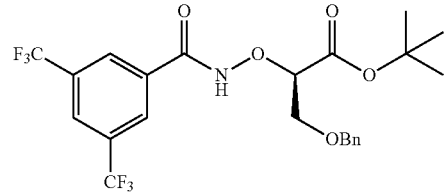

-continued

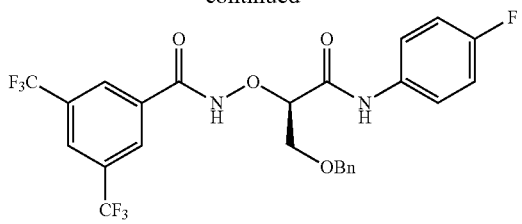
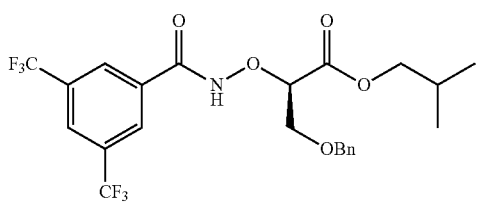
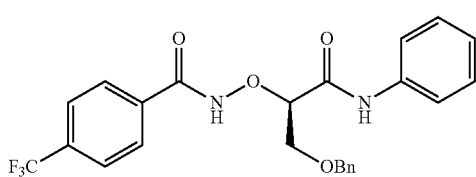
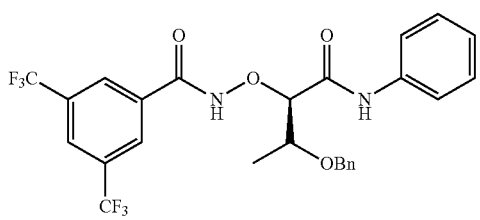
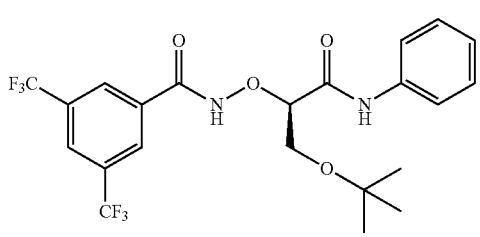
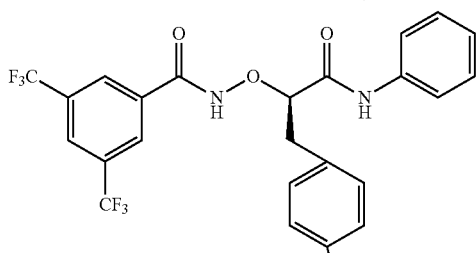
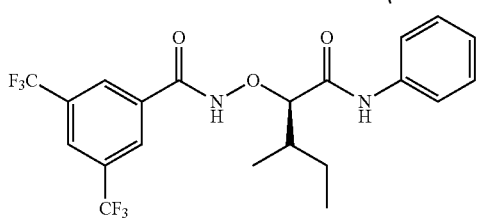

-continued

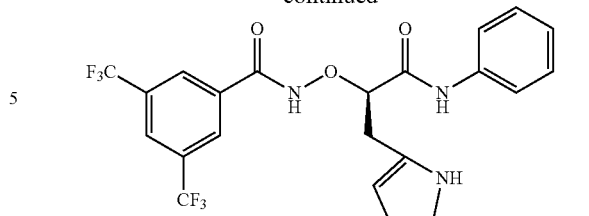
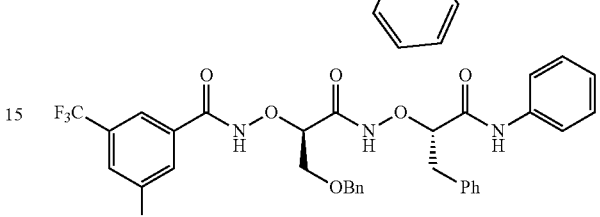
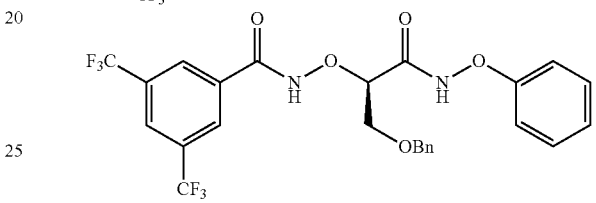

In certain embodiments, the compound is used as a drug.

In certain embodiments, the compound is used for the treatment of cancer including but not limited to ovarian, lung, skin, muscle, brain, liver, heart, blood, kidney, or spleen cells.

In certain embodiments, the compound is used for the treatment of cancer by inhibiting cancer stem cells.

In one embodiment, the cancer is ovarian cancer.

In one embodiment, the cancer is liver cancer.

In certain embodiments, the compound is used as method for inhibiting cancer stem cells.

In certain embodiments, the compound is used for the treatment of cancer or other diseases that are induced by affecting mitochondrial functions. In certain embodiments, the affected mitochondrial functions are mitochondrial membrane potential depolarization, superoxide production and respiration attenuation.

Provided herein is a pharmaceutical composition comprising at least a compound of formula (I, II, III, IV), a pharmaceutically acceptable salt, solvate or hydrate thereof, and at least one pharmaceutically acceptable excipient. In one embodiment, the pharmaceutical composition is used for the treatment of cancer. In one embodiment, the cancer is ovarian cancer. In another embodiment, the cancer is liver cancer.

In certain embodiments, the pharmaceutical composition is used in combination with another anticancer drug.

Provided herein is a pharmaceutical product comprising: the compound described herein and another chemotherapy compound in a combination product for simultaneous, separate or staggered use as a medicament. In one embodiment, the pharmaceutical product is used for the treatment of cancer. In one embodiment, the cancer is ovarian cancer. In another embodiment, the cancer is liver cancer.

Provided herein is a method of treating cancer or a proliferative disorder comprising the step of administering the compounds disclosed herein.

Provided herein is a method of inhibiting cancer stem cells in a subject comprising administering to the subject in need thereof a therapeutically effective amount of the compound disclosed herein. The cancer stem cells include but not limited to ovarian, lung, skin, muscle, brain, liver, heart, blood, kidney, or spleen cancer stem cells.

Provided herein is a method of inhibiting cancer stem cells in a subject comprising administering to the subject in need thereof a therapeutically effective amount of the compound disclosed herein. In certain embodiment, the cancer stem cells are not ovarian cells.

Provided herein is a method of treating cancer by inhibiting cancer stem cells wherein the cancer stem cells are inhibited by: (i) inducing mitochondrial membrane depolarization; (ii) production of reactive oxygen species; (iii) mitochondrial respiration attenuation.

In certain embodiments, the compounds induce cell death of cancer stem cells over cancer cells and normal cells with up to 60-fold selectivity.

In certain embodiments, the cancer stem cells (CSCs) undergo autophagy suppression and apoptosis. In certain embodiments, the compounds (i) decrease the population of CSCs; (ii) decrease the sphere forming ability of CSCs or (iii) in vivo tumor seeding ability of CSCs.

Provided herein is a kit comprising the pharmaceutical composition disclosed herein.

4. BRIEF DESCRIPTION OF THE DRAWINGS

The accompanying drawings, which are incorporated in and constitute a part of this specification, illustrate several embodiments of the disclosed method and compositions and together with the description, serve to explain the principles of the disclosed method and compositions.

Figure 12:
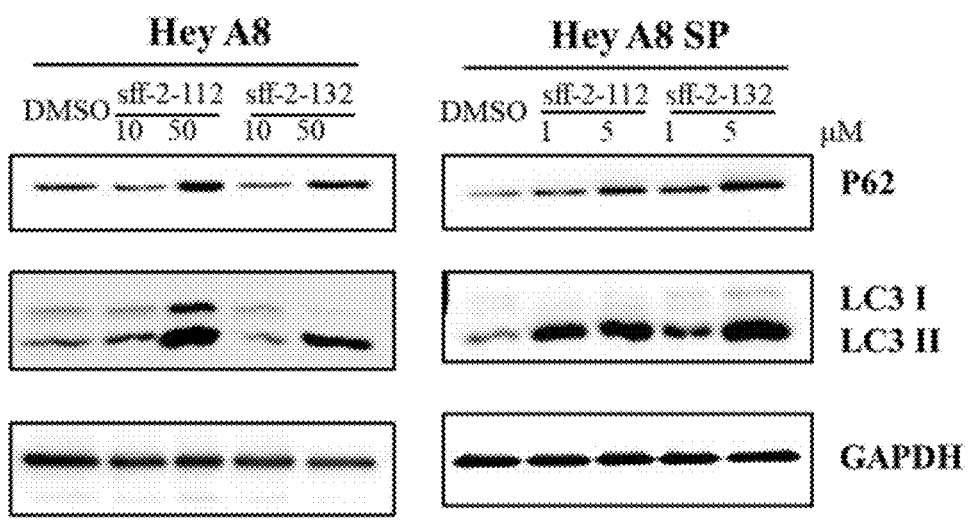

FIG. 12 is immunoblotting pages of autophagy associate proteins P62 and LC3. GAPDH was used as internal marker. The results showing that compound sff-2-112 ("Example 1") or sff-2-132 ("Example 4") selectively suppressed the autophagy of cancer stem cells.

Figure 13:
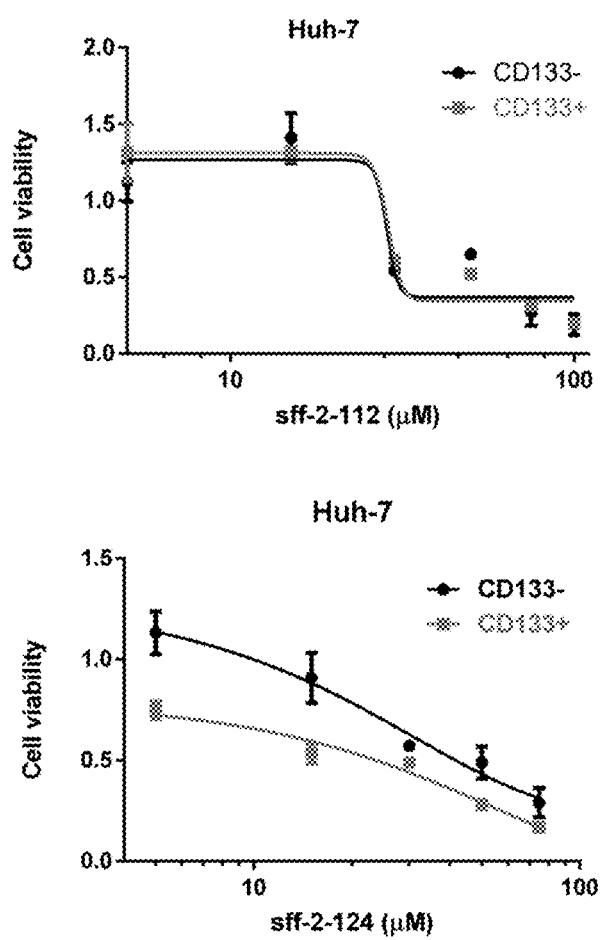

FIG. 13 are line graphs showing the comparative toxicity of compounds sff-2-112 ("Examples 1") and sff-2-124 ("Example 3") at different concentrations against liver cancer cells Huh 7 with lower and higher expression of CD133. Cell viability was measured after 48 h incubation with the molecules at indicated concentrations (µM).

5. DETAILED DESCRIPTION OF THE INVENTION

Cancer stem cells (CSCs) are subpopulations within tumors that are responsible for tumor growth and tumorigenesis. They are resistant to many current cancer treatments. Provided herein is a method for the treatment of cancer. Provided herein is a method for the treatment of cancer by inhibiting CSCs. Provided herein is a method to selectively eradicate drug resistant ovarian CSCs. Provided herein is a method to treat liver cancers by inducing the death of cancer cells or cancer stem cells. Provided herein are compounds bearing aminoxy acid units that induce the death of ovarian cancer cells, CSCs, liver cancer cells and CSCs. α-Aminoxy acids are analogs of amino acids with an extra oxygen inserted into the amine and α-carbon unit. They have extraordinary biostabilities. Their easy accessibility and highly structural modularity provide the possibilities to build a library for drug screen and development.

Provided herein are compounds that can induce the death of cancer cells and CSCs. The compounds provided can inhibit tumor formation. The compounds can selectively induce the death of CSCs by greater than 1-10, 10-20, 20-30, 30-40, 40-50, 50-60, 60-70, 70-80, 80-90, 90-100 fold selectivity over cancer cells. In certain embodiments, the compounds can induce the apoptotic cell death of cancer cells and CSCs. In certain embodiments, the compounds can induce autophagy suppression of cancer cells and CSCs. In certain embodiments, the compounds induce cell death by affecting cell mitochondrial functions, including but not limited to depolarizing mitochondrial membrane potential, reactive oxygen species production, mitochondrial respiration attenuation. In certain embodiments, the compounds could disrupt lysosomal pH. In certain embodiments, the compound is a small synthetic molecule containing α-aminoxy acid scaffold.

The inventors screened the library of aminoxy acids against ovarian cancer stem cells. Fourteen compounds including aminoxy acid monomers and dipeptides have been identified to show toxicity against ovarian HEY A8 CSCs.

The $IC_{50}$ values of compounds sff-2-112, sff-2-124, sff-2-132 and sff-2-100 to ovarian cancer HEY A8 cells, SKOV3 cells and their corresponding CSCs as well as normal cells were further evaluated. It has been found that these four molecules could induce the death of ovarian CSCs over ovarian cancer cells and normal cells with up to 60-fold toxicity against other normal cell lines NIH3T3, HEK293 and MDCK were also tested and the $IC_{50}$ values were summarized in Table 1. These data clearly suggested that compounds sff-2-112, sff-2-124, sff-2-132 and sff-2-100 can selectively induce the death of ovarian CSCs over ovarian cancer cells and normal cells.

TABLE 1

$IC_{50}$ values (μM) of compounds on different types of cell lines.

| | Cancer Stem Cell | | Cancer Cell | | Normal Cell | | |
|---|---|---|---|---|---|---|---|
| | HeyA8 SP | SKOV3 SP | HeyA8 | SKOV3 | HEK293 | MDCK | NIH3T3 |
| sff-2-112 (Example 1) | 1.5 ± 1.3 | 0.9 ± 0.9 | 23.4 ± 2.1 | 42.1 ± 5.2 | 51.0 ± 1.0 | 25.1 ± 1.1 | 30.5 ± 1.1 |
| Sff-2-124 (Example 3) | — | — | 20.8 ± 0.9 | 18.6 ± 5.1 | 67.2 ± 4.2 | 13.2 ± 0.9 | 15.1 ± 0.5 |
| sff-2-132 (Example 4) | 1.0 ± 0.9 | 1.0 ± 0.9 | 52.9 ± 1.9 | 63.4 ± 8.9 | 70.3 ± 1.7 | 49.1 ± 0.4 | 58.0 ± 2.2 |
| sff-2-100 (Example 13) | 2.8 ± 0.9 | — | 22.4 ± 1.0 | — | 18.3 ± 0.6 | 18.0 ± 0.7 | 2.8 ± 0.9 | selectivity. Compounds sff-2-112 and sff-2-132 were selected for further study. It has been demonstrated that these molecules could decrease the population of $CD133^+$ cells and sphere forming ability as well as in vivo tumor seeding ability of HEY A8 cells. The current inventions have also shown that compound sff-2-112 or sff-2-132 can affect cell mitochondrial function by inducing mitochondria membrane potential depolarization, superoxide production and respiration attenuation. After treatment, cancer cells underwent autophagy suppression and apoptosis.

The $IC_{50}$ values of compounds sff-2-112 and sff-2-124 to liver cancer Huh7 cells were also evaluated. CD133 was used as a marker for liver CSCs. It is found that these two compounds can kill both liver cancer cells (CD133−) and CSCs (CD133+).

Figure 1:
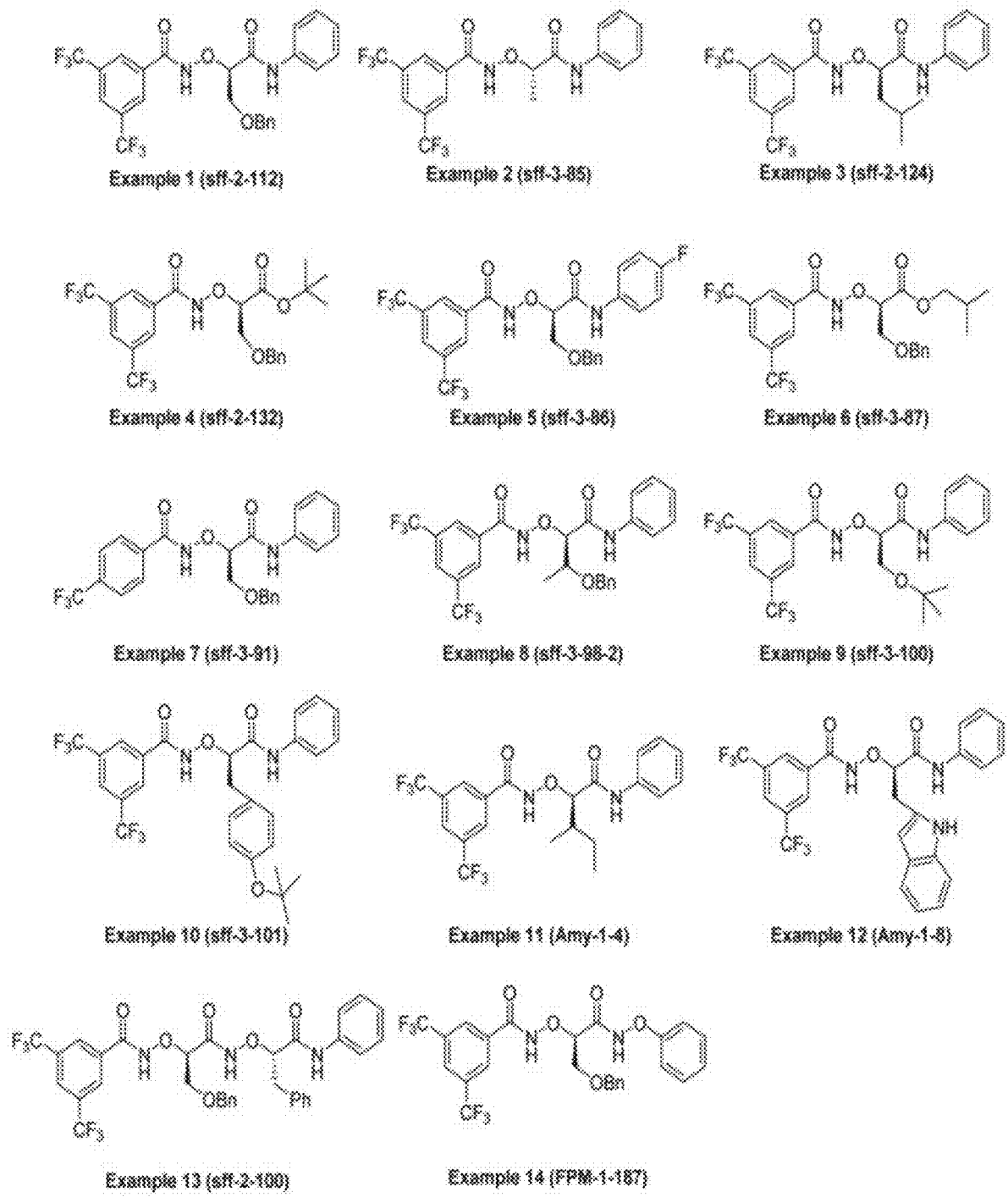
FIG. 1 is a diagram showing the chemical structures of synthetic compounds described in the examples section.
Figure 2:
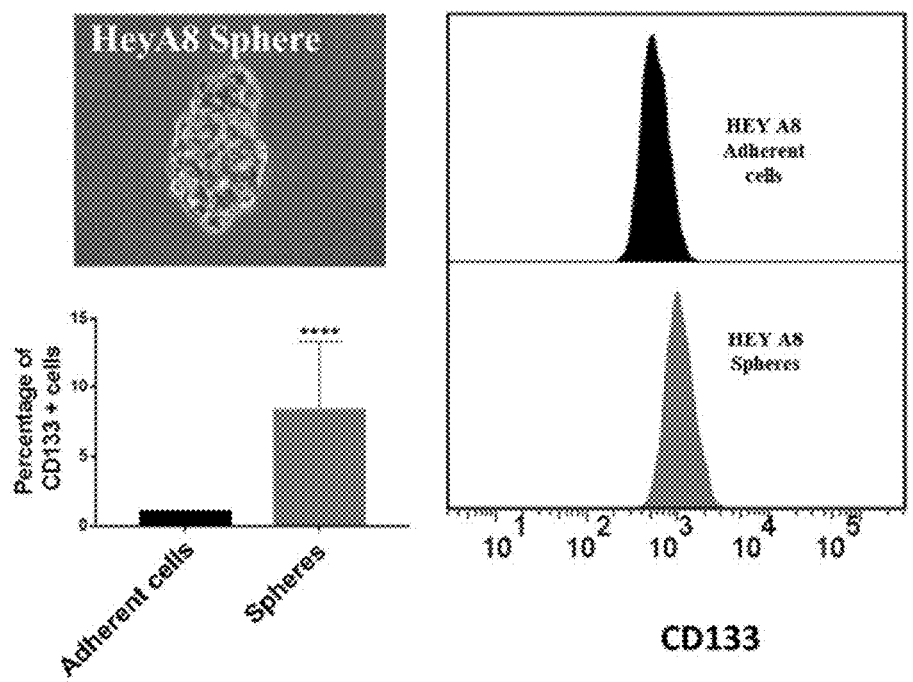
FIG. 2 are bar graphs showing that spheroids formed by ovarian cancer HEY A8 cells in suspension culture have higher population of cells with CD133 antigenic phenotype.
Figure 3:
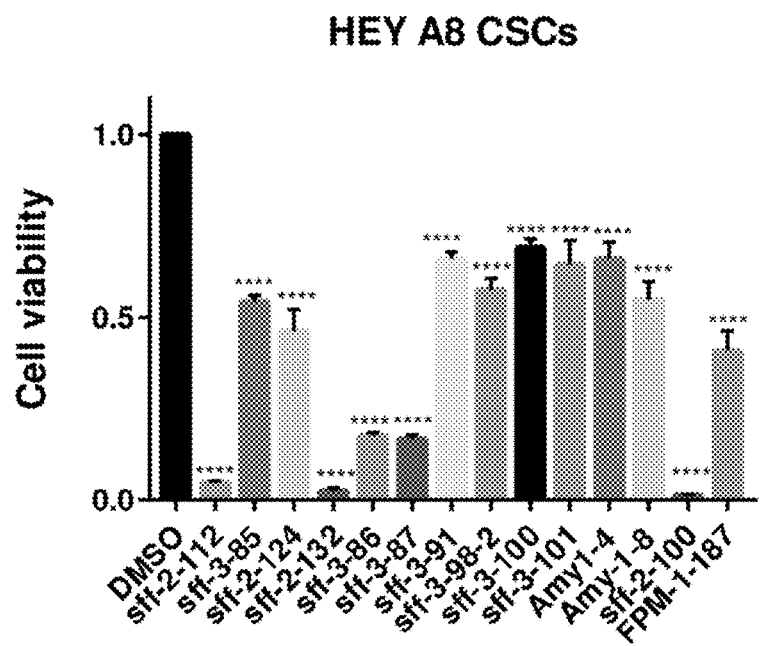
FIG. 3 are bar graphs showing cytotoxicity of examples 1 to 14 at the concentration of 5 µM to HEY A8 CSCs.

5.1 Compounds from Aminoxy Acids Library can Selectively Induce the Death of Ovarian CSCs Aminoxy acids were synthesized by the standard peptide coupling procedures. Their structures are shown in FIG. 1. The CSCs are obtained by spheroids culturing under suspension condition. It is confirmed that these spheres indeed contain significant higher population of cells with CD133 antigenic phenotype, which has been reported can represent ovarian CSCs (FIG. 2). After treatment with compounds for 48 h, the cell viability of CSCs was measured by using CELLTITER-GLO® luminescent reagent. Compound sff-3-85 ("Example 2") were used at the dose of 10 μM, all the other compounds were used at the concentration of 5 μM. All experiments were performed three times and data is presented as mean±SD.

Figure 4:
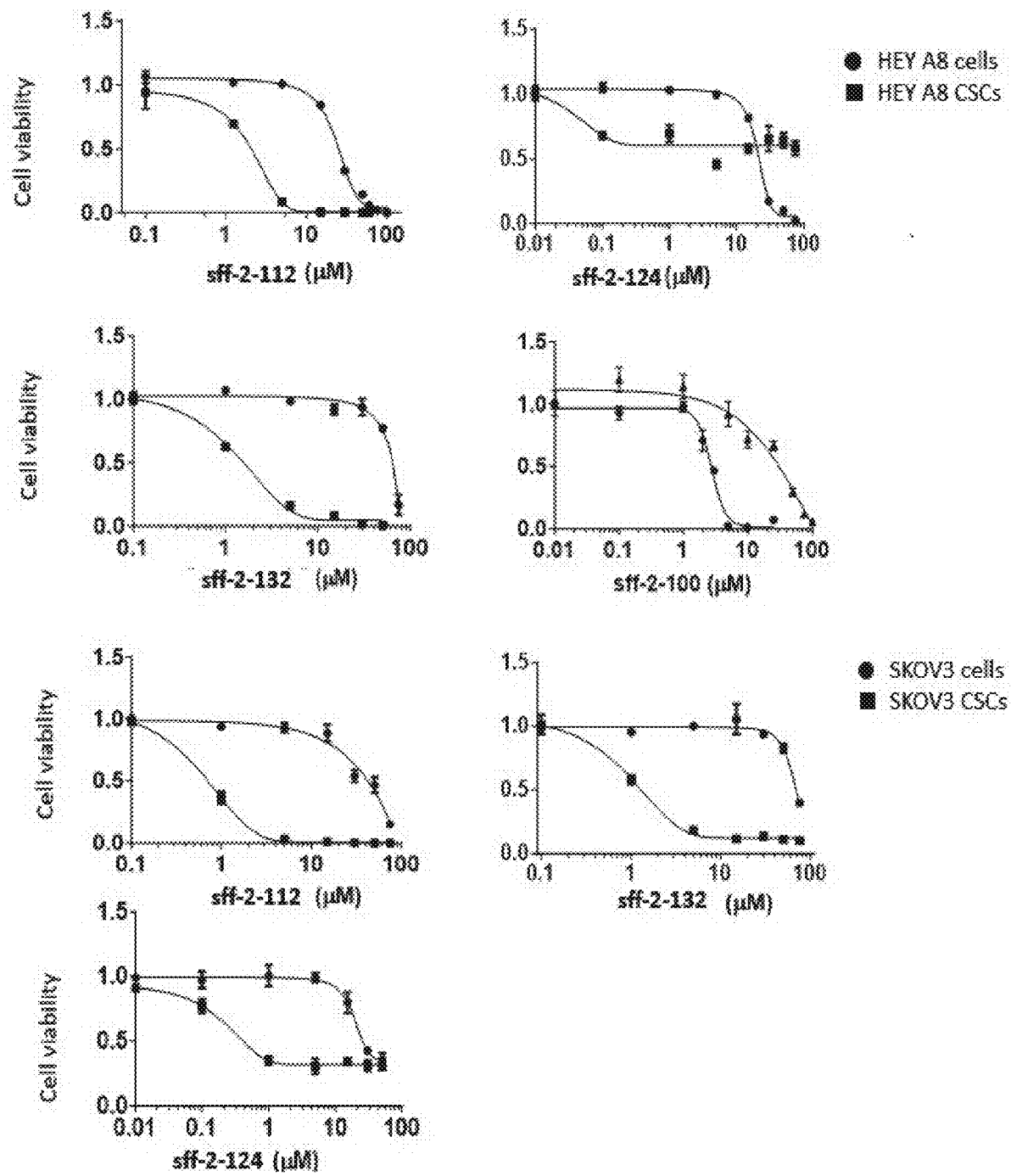
FIG. 4 are line graphs showing the comparative toxicity of compounds sff-2-112, sff-2-124, sff-2-132 and sff-2-100 ("Examples 1, 3, 4 and 14") at different concentrations against ovarian cancer cells Hey A8, SKOV3 and corresponding CSCs. Cell viability was measured after 48 h incubation with the molecules at indicated concentrations (µM).

Fourteen compounds including aminoxy acid monomers and dipeptides have been identified to show toxicity against HEY A8 CSCs. The half maximal inhibitory concentration ($IC_{50}$) values of compounds sff-2-112, sff-2-124, sff-2-132 and sff-2-100 towards adherent cancer HEY A8, SKOV3 cells and CSCs were further determined. As shown in FIG. 4, all these three molecules have been demonstrated with excellent selectivity towards CSCs over adherent cancer cells. Especially compound sff-2-132, its selectivity to CSCs is up to 60-fold higher than that to cancer cells. Their

5.2 Compounds Sff-2-112 and Sff-2-132 can Decrease $CD133^+$ Populations and Tumor Forming Ability of Cells CD133 has been reported to be a marker of ovarian CSCs. After cells treated with synthetic molecule, the population of $CD133^+$ cells were measured. HEY A8 cells were treated with taxol (100 nM), compound sff-2-112 ("Example 1") or sff-2-132 ("Example 4") at the concentration of 15 μM. Medium containing 0.1% DMSO was used as a negative control. Results in FIG. 5 have demonstrated that sff-2-112 ("Example 1") and compound sff-2-132 ("Example 4") significantly reduced the population of $CD133^+$ cells relative to DMSO treated group.

Figure 6:
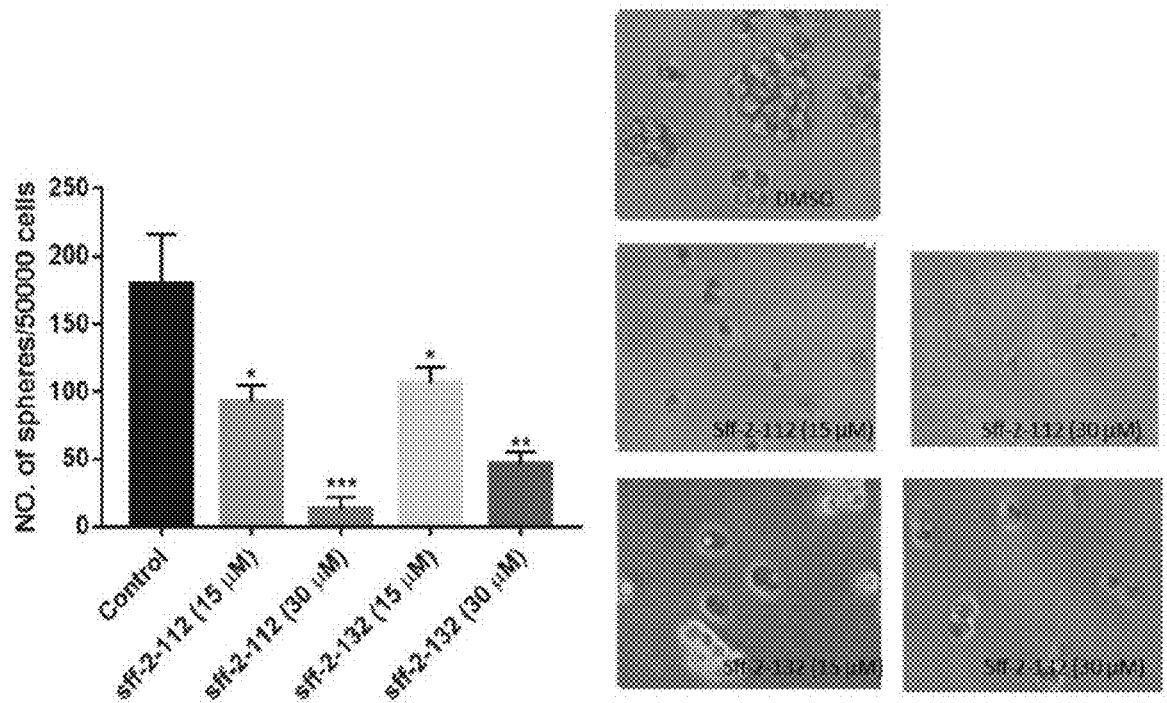
FIG. 6 is a bar graph showing that the sphere forming ability of cells treated with compound sff-2-112 ("Example 1") or sff-2-132 ("Example 4") were significantly reduced.
Figure 7:
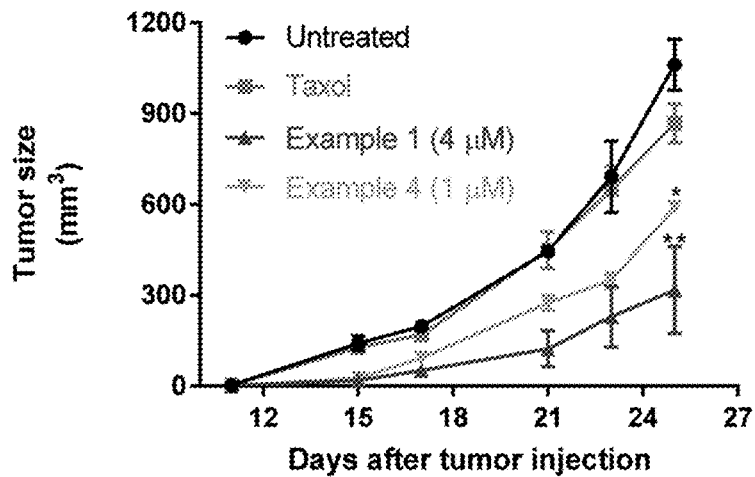
FIG. 7 is a line graph showing that, after cells were treated with compound sff-2-112 ("Example 1") or sff-2-132 ("Example 4") in vitro, their tumorigenicity ability in mice were significantly reduced.

Sphere-forming ability in suspension culture is correlated with CSC numbers in cancer cell lines. Results in FIG. 6 have shown that compound sff-2-112 ("Example 1") or sff-2-132 ("Example 4") significantly reduced sphere forming ability of ovarian cancer cells relative to DMSO treated group. In vivo tumor seeding ability of cells after treatment with compound sff-2-112 ("Example 1") or sff-2-132 ("Example 4") was also evaluated. Taxol was used as negative control. It can be observed that sff-2-112 ("Example 1") or compound sff-2-132 ("Example 4") pre-treatments resulted in a significantly decreased tumor size relative to taxol pre-treatment and untreated groups (FIG. 7). These findings indicated that CSCs within ovarian cancer spheres are resistant to taxol but sensitive to the treatment of compound sff-2-112 ("Example 1") or sff-2-132 ("Example 4").

Figure 8:
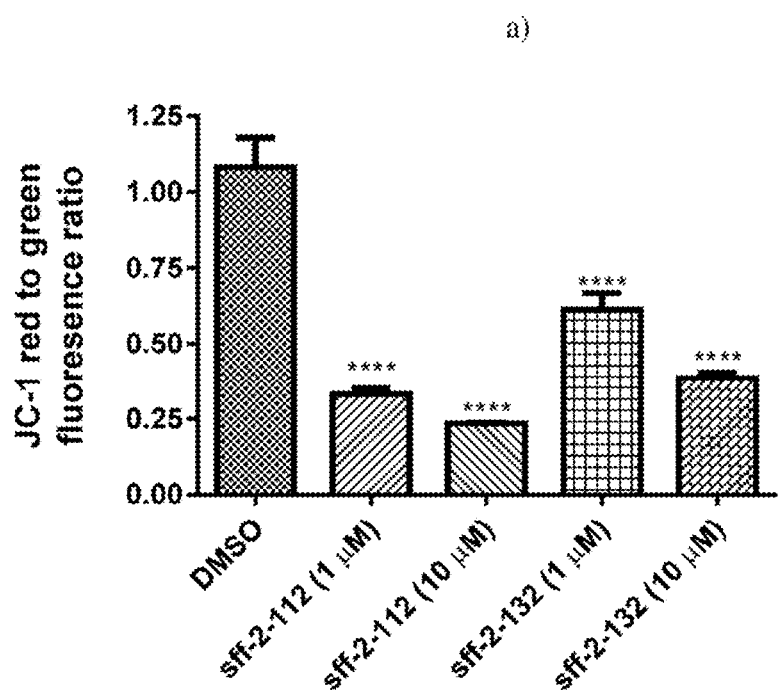
FIG. 8 is line graph showing that mitochondrial membrane potential immediately depolarized after addition of compound sff-2-112 ("Example 1") or sff-2-132 ("Example 4"). Mitochondrial membrane potential was monitored by JC-1 red to green ratio over time (s).
Figure 8:
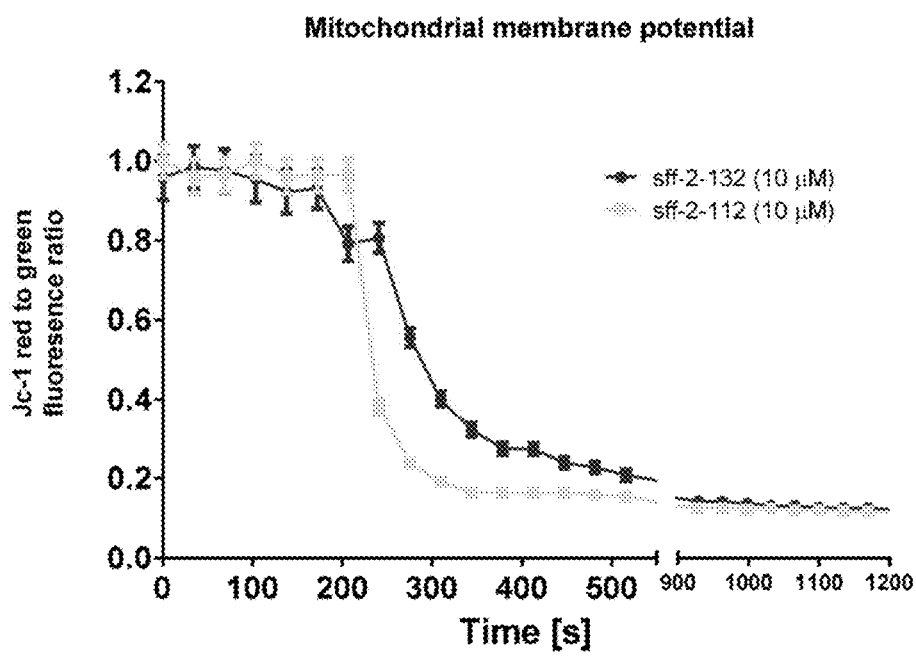

5.3 Synthetic Molecules can Affect Cell Mitochondrial Function, Induce Cell Apoptosis and Inhibit Cell Autophagy The effects of compound sff-2-112 ("Example 1") or sff-2-132 ("Example 4") on mitochondrial membrane potential was investigated in Hey A8 cells and CSCs (FIG. 8). The data in FIG. 8a showed that sff-2-112 ("Example 1") or sff-2-132 ("Example 4") can depolarize mitochondrial membrane potential in dose dependent manner. Kinetic studies have indicated that these two molecules depolarized mitochondrial membrane potential within 30 s upon addition (FIG. 8b).

Figure 9:
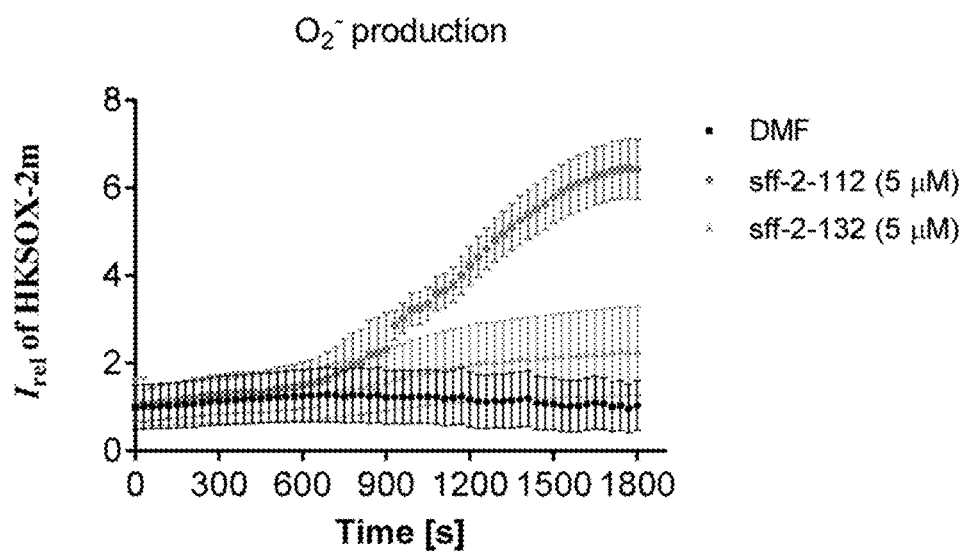
FIG. 9 is a line graph showing that compound sff-2-112 ("Example 1") or sff-2-132 ("Example 4") induced superoxide production in Hey A8 cells. The superoxide was measured by monitoring the change in relative fluorescence intensity of HKSOX-2m over time (s).

The ability of compound sff-2-112 ("Example 1") or sff-2-132 ("Example 4") to induce ROS production was also evaluated on HEY A8 cells (FIG. 9). The ROS production was monitored by superoxide fluorescent probe HKSOX-2m. The increase in fluorescence intensity indicated superoxide production. (n=50-100 cells).

Figure 10:
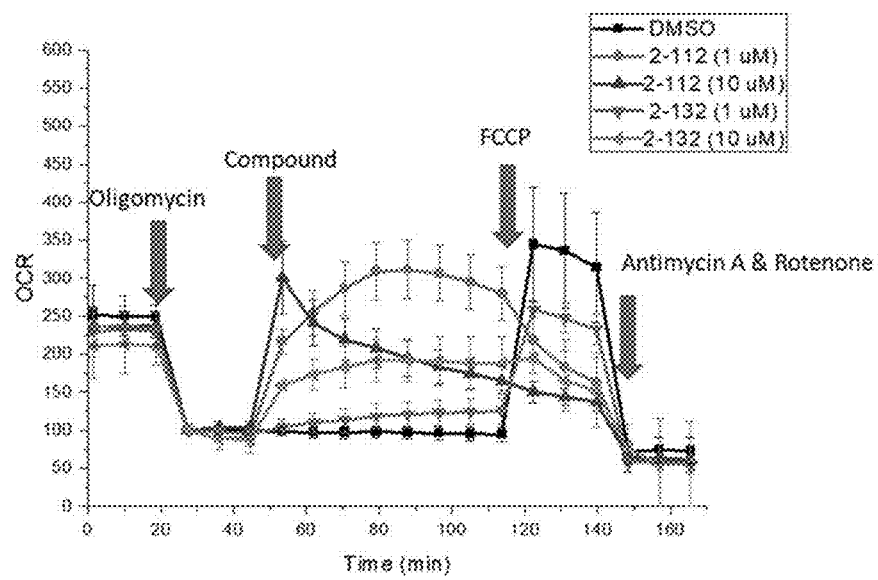
FIG. 10 is a line graph showing that compound sff-2-112 ("Example 1") or sff-2-132 ("Example 4") attenuated cancer cell respiration in a concentration dependent manner. The oxygen consumption rate (OCR) was measured by seahorse XF24 analyzer.

Later, it is also found that compound sff-2-112 ("Example 1") or sff-2-132 ("Example 4") can affect cell respiration. Cell oxygen consumption rate (OCR) was measured by using an XF24 Extracellular Flux Analyzer (Seahorse, Bioscience). After addition of sff-2-112 ("Example 1") or sff-2-132 ("Example 4"), OCR immediately increased. But later, cell respiration response to the subsequent addition of FCCP, anitimycin A and rotenone was significantly decreased (FIG. 10). These results indicated the respiration chain was affected by both compounds. These effects were more obvious when higher doses of the synthetic molecules were added.

Figure 11:
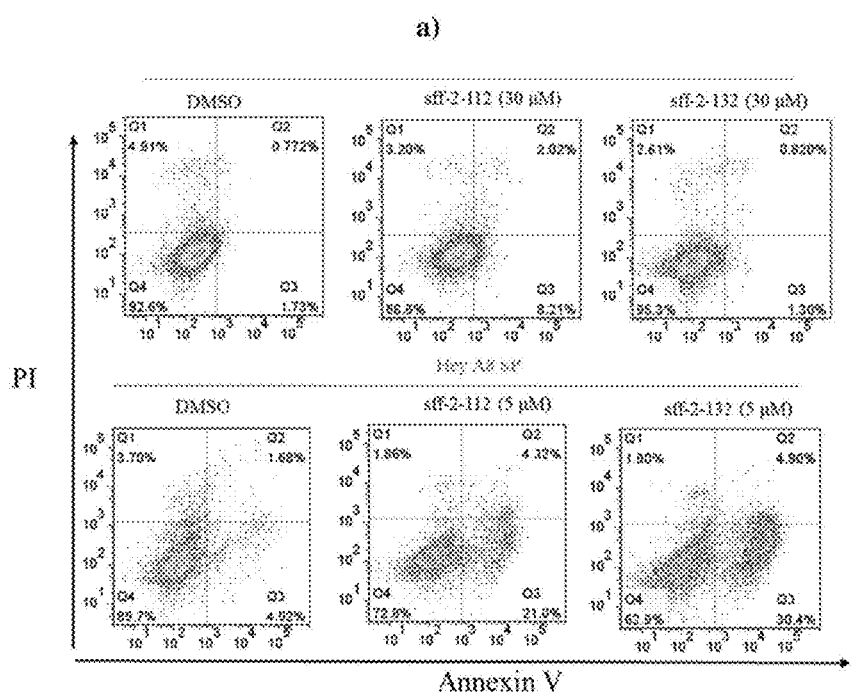
FIG. 11 are images showing that compound sff-2-112 ("Example 1") or sff-2-132 ("Example 4") selectively induced the apoptotic cell death of cancer stem cells. a) The cells were stained with Annexin V and PI. b) Immunoblotting of apoptosis associate proteins PARP, Caspase 3, Caspase 9 and Tubulin as internal marker.
Figure 11:
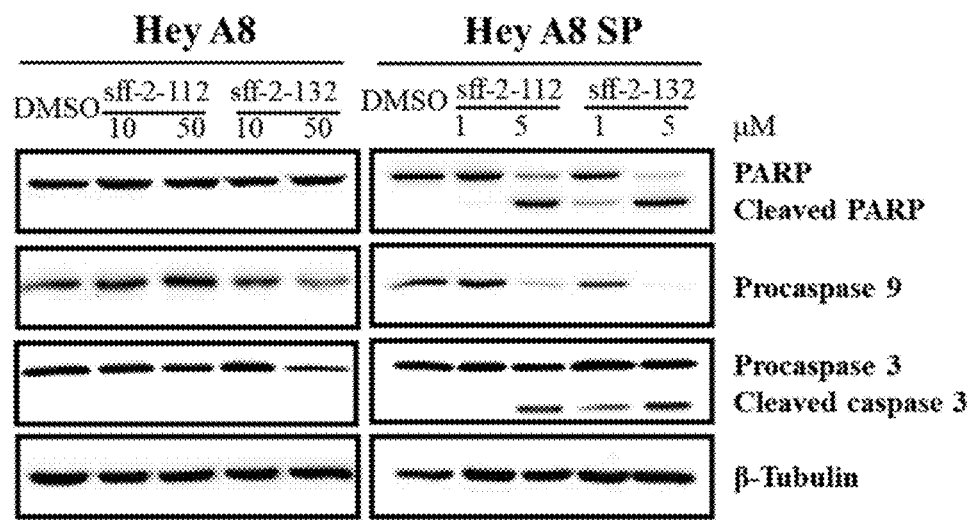

In addition, the current inventions have demonstrated that the above-mentioned effects of compound sff-2-112 ("Example 1") or sff-2-132 resulted in apoptosis of both HEY A8 cancer cells and CSCs. As shown in FIG. 11a that DMSO treatment of CSCs alone produced 4.92% Annexin V positive cells; Compound sff-2-112 ("Example 1") treatment at 5 µM produced 21.0% Annexin V positive cells; Example 5 treatment at 5 µM produced 30.4% Annexin V positive cells. For cancer cells, DMSO treatment alone produced 1.73% Annexin V positive cells; Example 1 treatment at 30 µM produced 8.21% Annexin V positive cells; Compound sff-2-132 ("Example 4") treatment at 5 µM produced 30.4% Annexin V positive cells. For cancer cells, DMSO treatment alone produced 1.73% Annexin V positive cells; Example 4 treatment at M produced 1.30% Annexin V positive cells. Although the concentration of compounds to CSCs were 6-fold lower than that to cancer cells, the apoptotic cell population of CSCs was much higher than that of cancer cells.

The activation of protein PARP1, Caspase 3 and Caspase 9 was also observed in CSCs even when the concentration of compounds were 10-fold lower than that of cancer cells (FIG. 11b). These results further demonstrated the highly selectivity of compound sff-2-112 ("Example 1") or sff-2-132 ("Example 4") to ovarian CSCs.

Finally, it has been demonstrated that autophagy in cells treated with compound sff-2-112 ("Example 1") or sff-2-132 ("Example 4") was inhibited. The effects were more obvious in CSCs even when the concentration of compound was 10-fold lower than that of cancer cells.

6. EXAMPLES

Example 1. Synthesis of Compounds

Compound sff-3-85, sff-3-100, sff-3-101 ("Examples 2, 9, and 10,") were synthesized according to the general procedures described below (Scheme I).

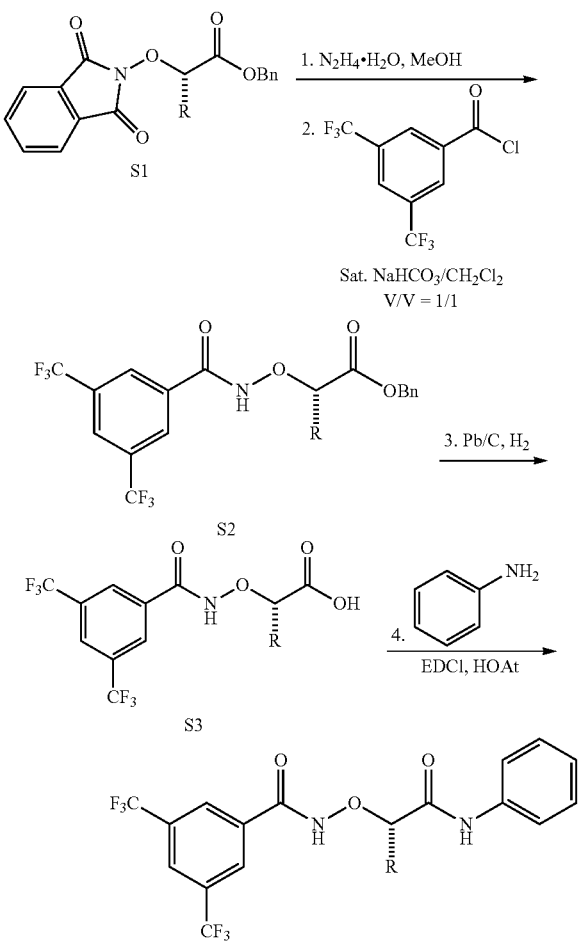

Scheme 1. Synthesis of compound sff-3-85, sff-3-100 and sff-3-101, ("Example 2, 9 and 10").

Compounds: sff-3-85, sff-3-100, sff-3-101
R = $CH_3$, $CH_2OC(CH_3)_3$, $CH_2(4\text{-}OC(CH_3)_3\text{-}C_6H_4)$ The starting material S1 was prepared according to the procedures described in Yang et al., J. Org., Chem., 2001, 66, 7303-7312. To a solution of compound S1 (1 mmol, 1 equiv) in MeOH/CHCl$_3$ (1:1, 10 ml) was added NH$_2$NH$_2$—H$_2$O (1.6 mmol, 1.6 equiv). After being stirred at room temperature for 2.5 h, the reaction mixture was concentrated in vacuo. The residue was dissolved in CH$_2$Cl$_2$ and washed with 5% NaHCO$_3$ and brine. The organic layer was dried over anhydrous Na2SO4 and concentrated to give a crude product of the free amine, which was used directly in the following steps without further purification. To a solution of the free amine dissolved in CH$_2$Cl$_2$ (5 ml) was added saturate NaHCO$_3$ solution (5 mL). Then 3,5-bis(trifluoromethyl)benzoyl chloride (1.2 mmol, 1.2 equiv) was added dropwise. After being stirred for 1 h, the reaction mixture was diluted with CH$_2$Cl$_2$. The aqueous layer was extracted with CH$_2$Cl$_2$ for three times. The combined organic layer was dried over anhydrous Na$_2$SO$_4$ and concentrated to give compound S2, which was used directly in the following steps. To a solution of compound S2 in CH$_2$Cl$_2$ (5 mL) was added 10% (w/w) Pb/C in H$_2$ atmosphere. After being stirred at room temperature for 2 h, the reaction mixture was filtered with celite. The filtrate was concentrated in vacuo to give compound S3, which was used directly in the peptide coupling. To a solution of the free acid S3 in CH$_2$Cl$_2$ (5 mL) were added EDCI (1.5 mmol, 1.5 equiv), HOAt (1.3 mmol, 1.3 equiv) and aniline (1.1 mmol, 1.1 equiv) sequentially. The reaction was stirred overnight at room temperature, then diluted with CH$_2$Cl$_2$ and washed with 5% NaHCO$_3$, 0.5 N HCl and brine. The organic layer was dried over anhydrous Na$_2$SO$_4$ and concentrated in vacuo. The residue was purified by silica gel column chromatography to afford compounds sff-3-85, sff-3-100 and sff-3-101 ("Examples 2, 9 and 10").

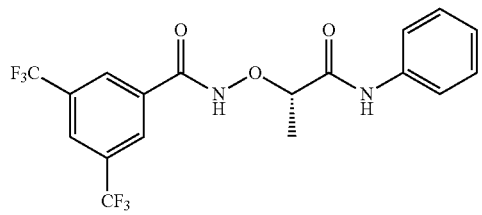

sff-3-85

Compound sff-3-85: $^1$H NMR (400 MHz, CDCl$_3$) δ 10.73 (s, 1H), 10.17 (s, 1H), 8.26 (s, 2H), 8.00 (s, 1H), 7.61 (s, 1H), 7.59 (s, 1H) 7.29-7.25 (m, 2H), 7.13 (t, J=7.37 Hz, 1H), 4.62-4.60 (m, 1H), 1.60 (d, J=6.99 Hz, 3H); $^{13}$C NMR (125 MHz, CDCl$_3$) δ 170.6, 165.7, 137.7, 133.2, 133.0 (q, $^2J_{C,F}$=33.8 Hz), 129.6, 128.2, 126.5, 125.5, 123.2 (q, $^1J_{C,F}$=272.3 Hz), 120.8, 84.7, 18.0; $^{19}$F (376 MHz, CDCl$_3$) δ −63.0;

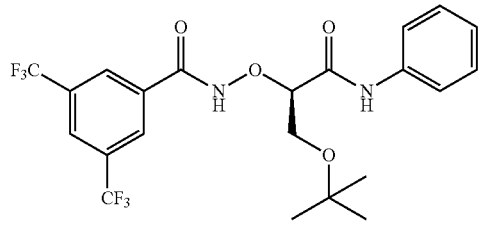

sff-3-100

Compound sff-3-100: $^1$H NMR (500 MHz, CDCl$_3$) δ 10.50 (s, 1H), 10.11 (s, 1H), 8.24 (s, 2H), 8.05 (s, 1H), 7.68-7.67 (m, 2H), 7.35-7.32 (t, J=7.9 Hz, 2H), 7.14-7.11 (m, 1H), 4.64-4.63 (m, 1H), 4.08-4.07 (m, 1H), 3.89-3.86 (m, 1H), 1.27 (s, 9H); $^{13}$C NMR (126 MHz, CDCl$_3$) δ 167.38, 165.37, 138.75, 134.33, 133.79 (q, $^2J_{C,F}$=34.7 Hz), 130.37, 128.83, 127.38, 126.03, 124.05 (q, $^2J_{C,F}$=273.7 Hz), 121.27, 88.31, 76.32, 63.81, 28.80; $^{19}$F (470 MHz, CDCl$_3$) δ −63.0; HRMS (ESI) for C$_{22}$H$_{23}$F$_6$N$_2$O$_4$(M+H$^+$): calcd 493.1478, found 493.0971.

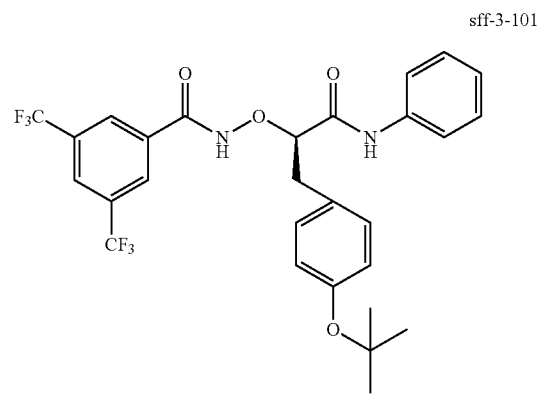 [SMILES: CC(C)(C)Oc1ccc(C[C@@H](ONC(=O)c2cc(C(F)(F)F)cc(C(F)(F)F)c2)C(=O)Nc2ccccc2)cc1]

sff-3-101

$^1$H NMR (500 MHz, CDCl$_3$+CD$_3$OD) δ 8.33 (s, 2H), 8.08 (s, 1H), 7.57-7.56 (m, 2H), 7.32-7.26 (m, 4H), 7.11 (t, J=7.3 Hz, 1H), 6.94 (s, 1H), 6.92 (s, 1H), 4.72-4.80 (m, 1H), 3.34-3.33 (m, 1H), 3.23-3.18 (m, 1H), 1.29 (s, 9H); $^{13}$C NMR (126 MHz, CDCl$_3$+CD$_3$OD) δ 168.35, 163.74, 153.06, 136.36, 132.52, 131.21 (q, $^2J_{C,F}$=37.4 Hz), 130.48, 129.26, 127.84, 126.98, 124.64, 123.77, 123.21, 122.07 (q, $^2J_{C,F}$=272.7 Hz), 119.30, 86.58, 77.80, 36.42, 27.35; $^{19}$F (470 MHz, CDCl$_3$) δ −59.9; HRMS (ESI) for C$_{28}$H$_{27}$F$_6$N$_2$O$_4$ (M+H$^+$): calcd 569.1791, found 569.1880.

Compound sff-2-124 ("Example 3") was synthesized according to the procedures described in Scheme 2.

Scheme 2. Synthesis of compound sff-2-124 ("Example 3").

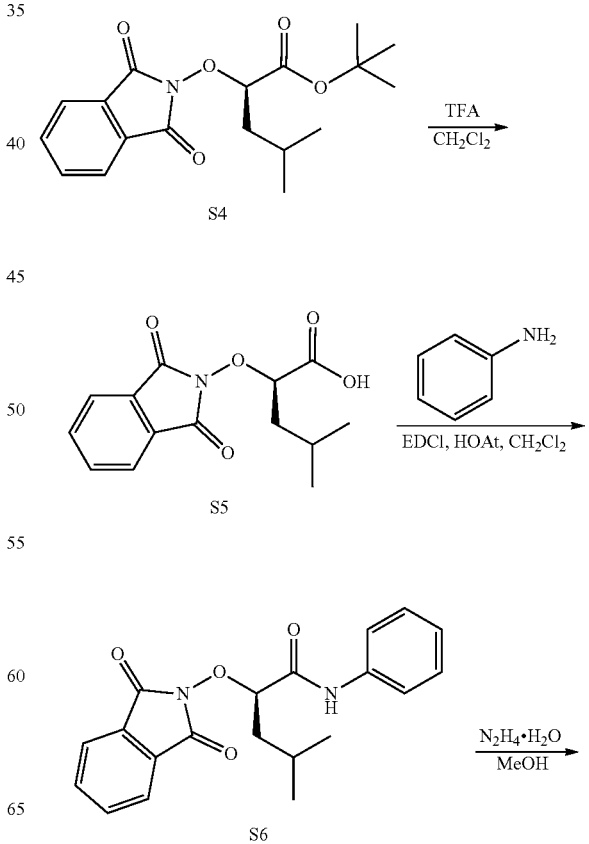

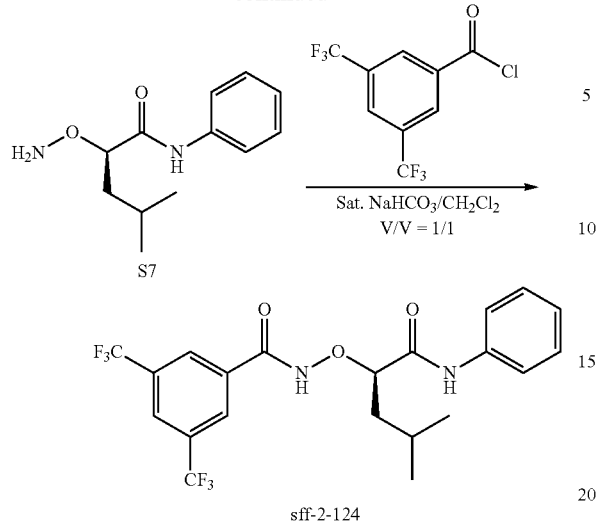

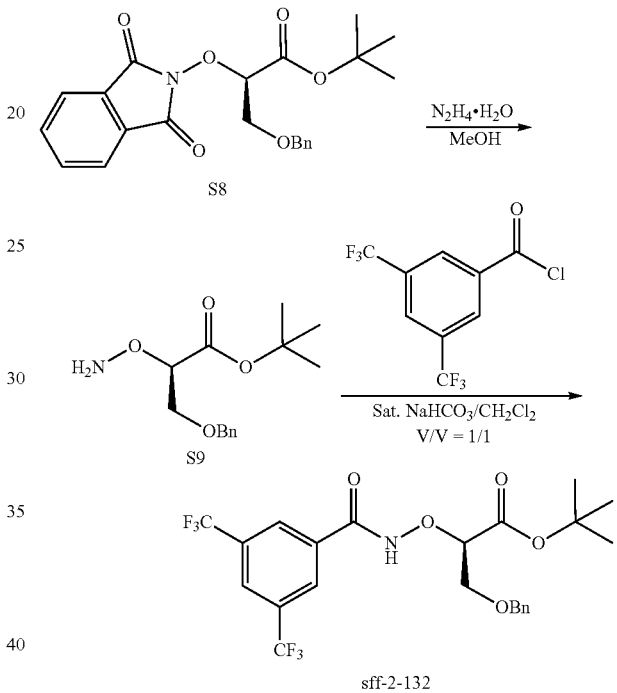

Scheme 3. Synthesis of compound sff-2-132 ("Example 4").

The starting material S4 was prepared according to the procedures described in Yang et al., J. Org., Chem., 2001, 66, 7303-7312. To the solution of compound 3-S8 (153.3 mg, 0.46 mmol) in $CH_2Cl_2$ (2.5 mL) was added an equal volume of $CF_3COOH$ (2.5 mL) through a syringe at room temperature. After being stirred at room temperature for 3 h, the reaction mixture was concentrated in vacuo. The residue was azeotroped with toluene twice to give free acid compound S5 as a white solid, which was used directly in next step without further purification.

To a solution of compound S5 in $CH_2Cl_2$ (4 mL) were added EDCI (132.3 mg, 0.69 mmol), HOAt (81.7 mg, 0.6 mmol) and aniline (46.6 mg, 0.5 mmol) sequentially. The reaction was stirred overnight at room temperature, then diluted with $CH_2Cl_2$ and washed with 5% $NaHCO_3$, 0.5 N HCl and brine. The organic layer was dried over anhydrous $Na_2SO_4$ and concentrated in vacuo. The residue was purified by silica gel column chromatography to afford compound S6 (240.7 mg, 99% yield) as a white solid. $^1H$ NMR (500 MHz, $CDCl_3$) δ 9.47 (s, 1H), 7.85-7.84 (m, 2H), 7.78-7.75 (m, 4H), 7.37-7.34 (m, 2H), 7.13 (t, J=7.4 Hz, 1H), 4.91 (dd, J=9.5 Hz, 3.6 Hz, 1H), 2.23-2.16 (m, 1H), 1.99-1.85 (m, 2H), 1.16 (d, J=6.6 Hz, 3H), 1.05 (d, J=6.6 Hz, 3H); $^{13}C$ NMR (125 MHz, $CDCl_3$) δ 168.9, 164.4, 137.7, 135.2, 129.1, 128.8, 124.6, 124.1, 120.0, 87.2, 42.0, 25.0, 23.4, 21.9; HRMS (ESI) for $C_{20}H_{21}N_2O_4$ (M+H$^+$): calcd 353.1496, found 353.1492.

To a solution of compound S6 (140.9 mg, 0.40 mmol) in $MeOH/CHCl_3$ (1:1, 5 mL) was added $NH_2NH_2$—$H_2O$ (40.1 mg, 0.80 mmol). After being stirred at room temperature for 2.5 h, the reaction mixture was concentrated in vacuo. The residue was dissolved in $CH_2Cl_2$ and washed with 5% $NaHCO_3$ and brine. The organic layer was dried over anhydrous $Na_2SO_4$ and concentrated to give a crude product of compound S7, which was used directly in the following step without further purification.

To a solution of compound S7 dissolved in $CH_2Cl_2$ (2.5 mL) was added saturate $NaHCO_3$ solution (2.5 mL). Then 3,5-bis(trifluoromethyl)benzoyl chloride (110.6 mg, 0.40 mmol) was added dropwise. After being stirred overnight, the reaction mixture was diluted with $CH_2Cl_2$. The aqueous layer was extracted with $CH_2Cl_2$ for three times. The combined organic layer was dried over anhydrous $Na_2SO_4$ and concentrated. The crude oil was purified by flash column chromatography to afford compound sff-2-124 (86.9 mg, 47% yield) as a white solid. $^1H$ NMR (400 MHz, $CD_3CN$) δ 10.51 (s, 1H), 9.88 (s, 1H), 8.31 (s, 2H), 8.19 (s, 1H), 7.68 (d, J=8.0 Hz, 2H), 7.36-7.32 (m, 2H), 7.13-7.09 (m, 1H), 4.51 (dd, J=9.6, 3.8 Hz, 1H), 1.90-2.02 (m, 1H), 1.83-1.70 (m, 2H), 1.06 (d, J=6.6 Hz, 3H), 1.01 (d, J=6.6 Hz, 3H); $^{13}C$ NMR (150 MHz, $CD_3OD$) δ 172.2, 164.8, 139.1, 135.2, 133.1 (q, $^2J_{C,F}$=22.5 Hz), 139.9, 129.0, 127.1, 125.7, 124.4 (q, $^1J_{C,F}$=270.0 Hz), 121.3, 86.6, 42.0, 25.9, 23.6, 22.3; $^{19}F$ (376 MHz, $CD_3CN$) 6-63.0; HRMS (ESI) for $C_{21}H_{20}F_6N_2O_3Na$ (M+Na$^+$): calcd 485.1276, found 485.1283.

To a solution of compound S8 (794.8 mg, 2.0 mmol) in MeOH (20 mL) was added $NH_2NH_2$—$H_2O$ (400.5 mg, 8.0 mmol). After being stirred at room temperature for 2.5 h, the reaction mixture was concentrated in vacuo. The residue was dissolved in $CH_2Cl_2$ and washed with 5% $NaHCO_3$ and brine. The organic layer was dried over anhydrous $Na_2SO_4$ and concentrated to give a crude product of compound S9, which was used directly in the following steps without further purification.

To a solution of compound S9 dissolved in $CH_2Cl_2$ (10 mL) was added saturate $NaHCO_3$ solution (10 mL). Then 3,5-bis(trifluoromethyl)benzoyl chloride (553.1 mg, 2.0 mmol) was added dropwise. After being stirred overnight, the reaction mixture was diluted with $CH_2Cl_2$. The aqueous layer was extracted with $CH_2Cl_2$ for three times. The combined organic layer was dried over anhydrous $Na_2SO_4$ and concentrated. The crude oil was purified by flash column chromatography to afford compound sff-2-132 (862.6 mg, 85% yield) as a colorless oil. $^1H$ NMR (500 MHz, $CD_3CN$) δ 10.17 (s, 1H), 8.24 (s, 2H), 8.16 (s, 1H), 7.36-7.29 (m, 5H), 4.63 (t, J=3.3 Hz, 1H), 4.57 (q, J=11.8 Hz, 2H), 3.93-3.87 (m, 2H), 1.46 (s, 9H); $^{13}C$ NMR (125 MHz, $CDCl_3$) δ 169.0, 163.4, 137.4, 133.8, 132.2 (q, $^2J_{C,F}$=34.0 Hz), 128.5, 128.0, 127.9, 127.6, 125.3, 123.0 (q, $^1J_{C,F}$=271.3 Hz), 83.4, 77.4, 73.7, 69.2, 28.1; $^{19}$F (376 MHz, CDCl$_3$) δ –63.0; HRMS (ESI) for C$_{23}$H$_{23}$F$_6$NO$_5$Na (M+Na$^+$): calcd 530.1378, found 530.1395.

Scheme 4. Synthesis of compound sff-3-86 ("Example 5").

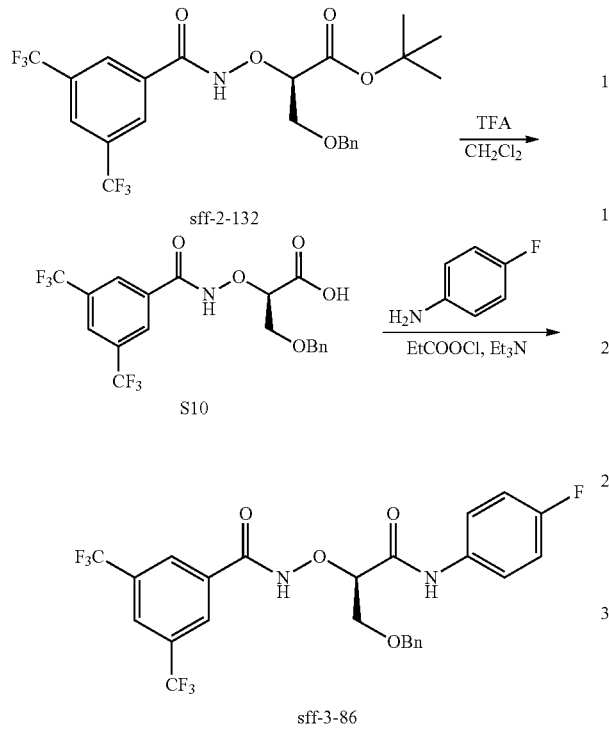

To a solution of compound sff-2-132 (152.2 mg, 0.30 mmol) in CH$_2$Cl$_2$ (1.5 mL) was added an equal volume of CF$_3$COOH (1.5 mL) through a syringe at room temperature. After being stirred at room temperature for 3 h, the reaction mixture was concentrated in vacuo. The residue was azeotroped with toluene twice to give free acid compound S10 as a white solid, which was used directly in the amide coupling.

To a solution of compound S10 (71.9 mg, 0.16 mmol) in dry THF (1.5 mL) was added triethylamine (19 mg, 0.19 mmol) followed by EtCOOCl (17.4 mg, 0.16 mmol) at –20° C. under argon atmosphere. After being stirred for 20 min, 4-fluoroaniline (20.0 mg, 0.18 mmol) dissolved in dry THF (0.5 ml) was added, the reaction was allowed to stir overnight at room temperature. After that, 10 ml water was added, the mixture was extracted with CH$_2$Cl$_2$ three times. The combined organic layers were washed with 5% NaHCO$_3$ and brine. The organic layer was dried over anhydrous Na$_2$SO$_4$ and concentrated to give a crude oil, which was purified by flash column to afford compound sff-3-86 (52.3 mg, 62%) as a white solid. $^1$H NMR (400 MHz, CDCl$_3$) δ 10.42 (br, 1H), 10.35 (br, 1H), 8.15 (s, 2H), 8.01 (s, 1H), 7.60 (s, 2H), 7.27-7.23 (m, 5H), 6.99 (t, J=8.6 Hz, 2H), 4.68-4.66 (m, 1H), 4.57 (AB$_q$, J$_{AB}$=15.1 Hz, 2H), 4.10 (dd, J=11.1, 2.4 Hz, 1H), 3.93 (dd, J=11.1, 7.9 Hz, 1H); $^{13}$C (125 MHz, CDCl$_3$) δ 166.7, 165.5, 160.2 (d, $^1$J$_{C,F}$=237.8 Hz), 137.6, 133.9, 133.1, 133.0 (q, $^2$J$_{C,F}$=34.15 Hz), 129.2, 128.9, 128.5, 128.2, 126.7, 125.5 (q, $^1$J$_{C,F}$=272.2 Hz), 122.3 (d, $^3$J$_{C,F}$=7.2 Hz), 116.2 (d, $^2$J$_{C,F}$=21.8 Hz), 87.8, 74.6, 70.5; $^{19}$F (376 MHz, CDCl$_3$) δ –62.9; HRMS (ESI) for C$_{25}$H$_{20}$F$_7$N$_2$O$_4$(M+H$^+$): calcd 544.1228, found 545.1265.

Scheme 5. Synthesis of compound sff-3-87 ("Example 6").

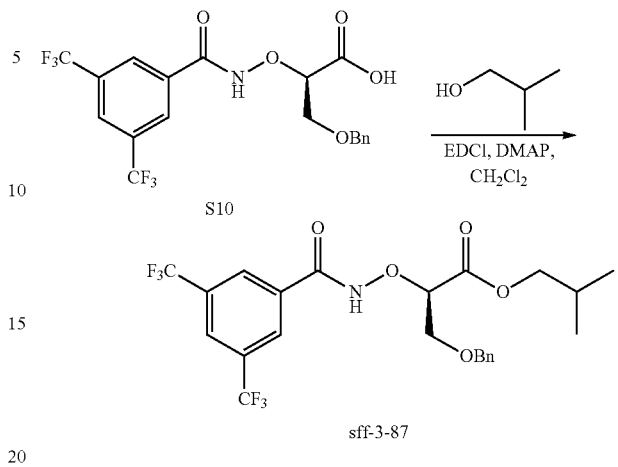

To a solution of compound S10 (51.2 mg, 0.11 mmol) in CH$_2$Cl$_2$ (1.5 mL) were added EDCI (28.9 mg, 0.15 mmol), DMAP (4.2 mg, 0.03 mmol) and isobutyl alcohol (25.3 mg, 0.34 mmol) sequentially. The reaction was stirred overnight at room temperature, then diluted with CH$_2$Cl$_2$ and washed with 5% NaHCO$_3$, 0.5 N HCl and brine. The organic layer was dried over anhydrous Na$_2$SO$_4$ and concentrated in vacuo. The residue was purified by silica gel column chromatography to afford compound sff-3-87 (47.4 mg, 82% yield) as a white solid. $^1$H NMR (400 MHz, CDCl$_3$) δ 10.28 (br, 1H), 8.21 (s, 2H), 7.96 (s, 1H), 7.29-7.25 (m, 5H), 4.87 (br, 1H), 4.59-4.49 (m, 2H), 4.05-3.93 (m, 4H), 1.97-1.89 (m, 1H), 0.92 (s, 3H), 0.90 (s, 3H); $^{13}$C NMR (126 MHz, CDCl$_3$) δ 169.92, 137.16, 132.04 (q, $^2$J$_{C,F}$=33.8 Hz), 128.41, 127.90, 127.75, 127.50, 127.23, 124.98, 122.89 (q, $^1$J$_{C,F}$=272.9 Hz), 82.66, 73.64, 71.80, 68.86, 27.65, 18.89; $^{19}$F (376 MHz, CDCl$_3$) δ –62.9; HRMS (ESI) for C$_{23}$H$_{24}$F$_6$NO$_5$ (M+H$^+$): calcd 509.1553, found 509.1587.

Scheme 6. Synthesis of compound sff-3-91 ("Example 7").

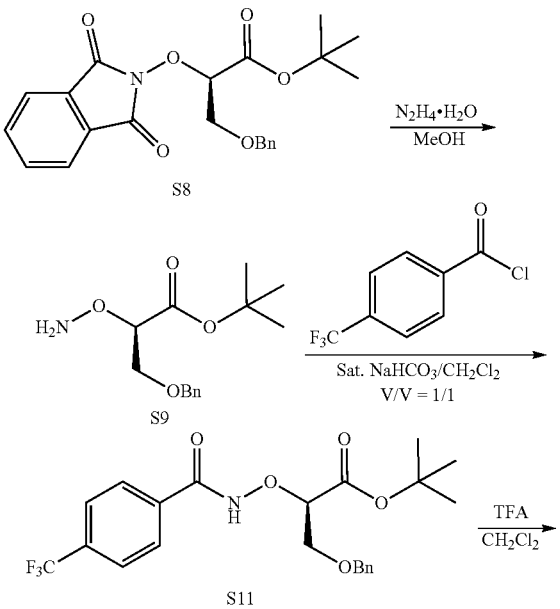

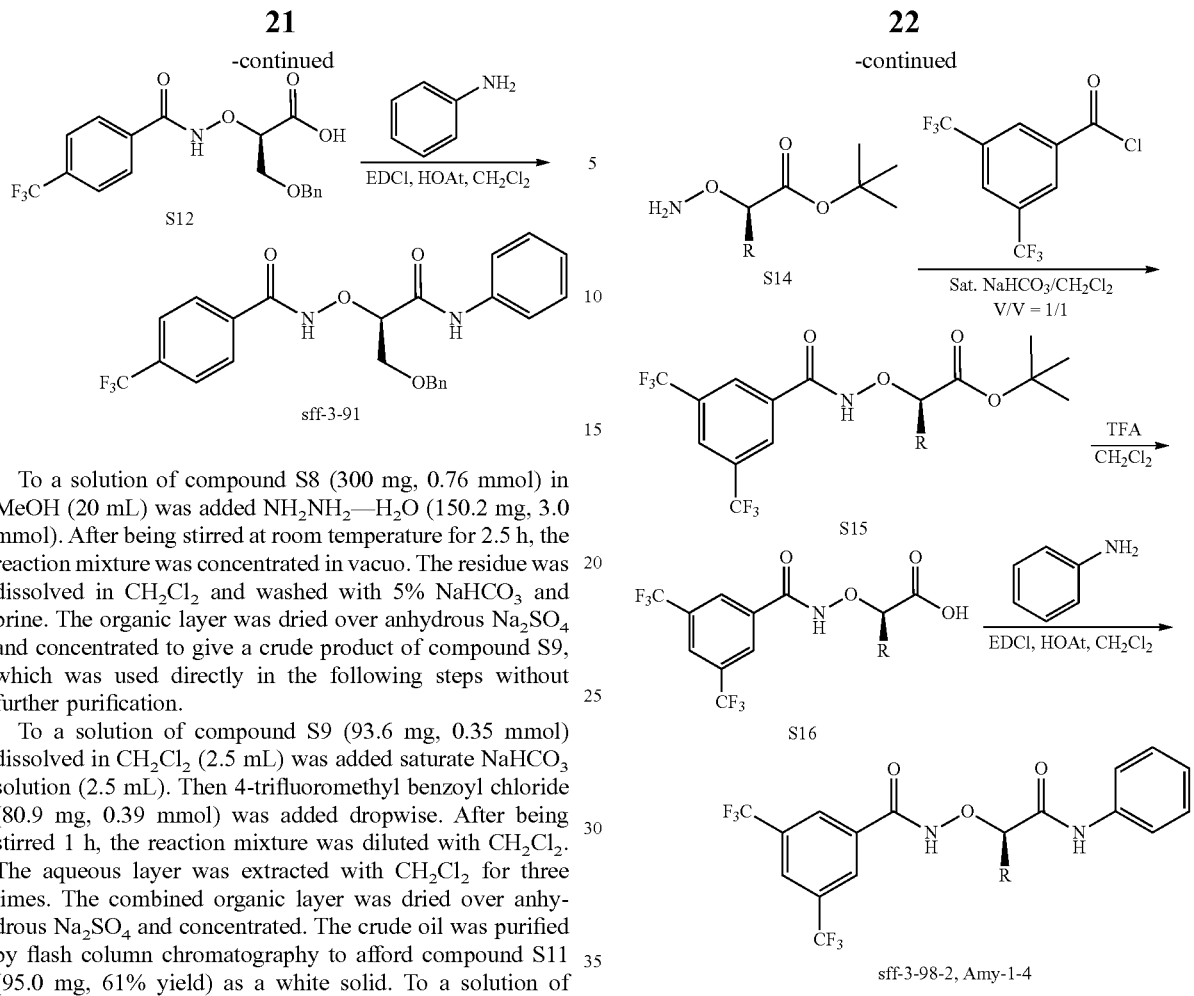

To a solution of compound S8 (300 mg, 0.76 mmol) in MeOH (20 mL) was added $NH_2NH_2$—$H_2O$ (150.2 mg, 3.0 mmol). After being stirred at room temperature for 2.5 h, the reaction mixture was concentrated in vacuo. The residue was dissolved in $CH_2Cl_2$ and washed with 5% $NaHCO_3$ and brine. The organic layer was dried over anhydrous $Na_2SO_4$ and concentrated to give a crude product of compound S9, which was used directly in the following steps without further purification.

To a solution of compound S9 (93.6 mg, 0.35 mmol) dissolved in $CH_2Cl_2$ (2.5 mL) was added saturate $NaHCO_3$ solution (2.5 mL). Then 4-trifluoromethyl benzoyl chloride (80.9 mg, 0.39 mmol) was added dropwise. After being stirred 1 h, the reaction mixture was diluted with $CH_2Cl_2$. The aqueous layer was extracted with $CH_2Cl_2$ for three times. The combined organic layer was dried over anhydrous $Na_2SO_4$ and concentrated. The crude oil was purified by flash column chromatography to afford compound S11 (95.0 mg, 61% yield) as a white solid. To a solution of compound S11 (70.0 mg, 0.16 mmol) in $CH_2Cl_2$ (2 mL) were added EDCI (45.8 mg, 0.24 mmol), HOAt (28.3 mg, 0.21 mmol) and aniline (18.6 mg, 0.18 mmol) sequentially. The reaction was stirred overnight at room temperature, then diluted with $CH_2Cl_2$ and washed with 5% $NaHCO_3$, 0.5 N HCl and brine. The organic layer was dried over anhydrous $Na_2SO_4$ and concentrated in vacuo. The residue was purified by silica gel column chromatography to afford compound sff-3-91 (63.8 mg, 87% yield) as a white solid. $^1H$ NMR (300 MHz, $CDCl_3$) δ 10.47 (s, 1H), 9.96 (s, 1H), 7.79-7.63 (m, 6H), 7.35-7.26 (d, J=7.6 Hz, 7H), 7.12 (t, J=7.4 Hz, 1H), 4.70-4.57 (m, 3H), 4.17 (dd, J=11.1, 2.4 Hz, 1H), 3.97 (dd, J=11.4, 9.2 Hz, 1H); $^{13}C$ NMR (126 MHz, $CDCl_3$) δ 166.47, 165.92, 137.58, 137.24, 134.35 (q, $^2J_{C,F}$=32.8 Hz), 133.72, 128.98, 128.69, 128.28, 128.08, 127.72, 125.85, 124.61, 123.42 (q, $^1J_{C,F}$=274.2 Hz), 119.92, 86.95, 73.94, 70.14; $^{19}F$ (376 MHz, $CDCl_3$) δ–63.1; HRMS (ESI) for $C_{24}H_{22}F_3N_2O_4$ (M+H$^+$): calcd 459.1448, found 459.1502.

Scheme 7. Synthesis of compound sff-3-98-2 and Amy-1-4 ("Example 8 and 11").

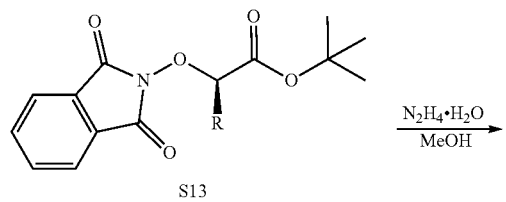

The starting material S13 was prepared according to the procedures described in Yang et al., J. Org., Chem., 2001, 66, 7303-7312. To a solution of compound S13 (1 mmol, 1 equiv) in MeOH/$CHCl_3$ (1:1, 10 ml) was added $NH_2NH_2$—$H_2O$ (1.6 mmol, 1.6 equiv). After being stirred at room temperature for 2.5 h, the reaction mixture was concentrated in vacuo. The residue was dissolved in $CH_2Cl_2$ and washed with 5% $NaHCO_3$ and brine. The organic layer was dried over anhydrous $Na_2SO_4$ and concentrated to give a crude product of the free amine S14, which was used directly in the following steps without further purification. To a solution of the free amine S14 dissolved in $CH_2Cl_2$ (5 ml) was added saturate $NaHCO_3$ solution (5 mL). Then 3,5-bis(trifluoromethyl)benzoyl chloride (1.2 mmol, 1.2 equiv) was added dropwise. After being stirred for 1 h, the reaction mixture was diluted with $CH_2Cl_2$. The aqueous layer was extracted with $CH_2Cl_2$ for three times. The combined organic layer was dried over anhydrous $Na_2SO_4$ and concentrated to give a crude oil, which was purified by silica gel column chromatography to afford compound S15.

To a solution of compound S15 in $CH_2Cl_2$ was added an equal volume of $CF_3COOH$ through a syringe at room temperature. After being stirred at room temperature for 3 h, the reaction mixture was concentrated in vacuo. The residue was azeotroped with toluene twice to give free acid compound S16, which was used directly in the amide coupling. To a solution of the free acid S16 in $CH_2Cl_2$ were added EDCI (1.5 mmol, 1.5 equiv), HOAt (1.3 mmol, 1.3 equiv)

and aniline (1.1 mmol, 1.1 equiv) sequentially. The reaction was stirred overnight at room temperature, then diluted with $CH_2Cl_2$ and washed with 5% $NaHCO_3$, 0.5 N HCl and brine. The organic layer was dried over anhydrous $Na_2SO_4$ and concentrated in vacuo. The residue was purified by silica gel column chromatography to afford compounds sff-3-98-2 and Amy-1-4 ("Examples 8 and 11").

sff-3-98-2

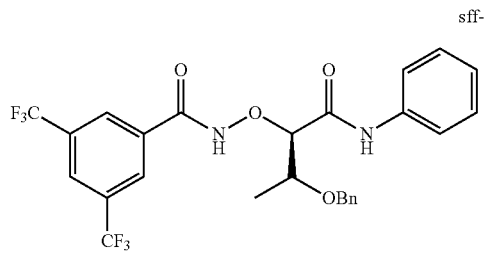

Compound sff-3-98-2: $^1$H NMR (400 MHz, $CDCl_3$) δ 10.42 (s, 1H), 10.29 (s, 1H), 8.16 (s, 2H), 8.03 (s, 1H), 7.70-7.69 (m, 2H), 7.36-7.26 (m, 7H), 7.13 (t, J=7.4 Hz, 1H), 4.75-4.54 (m, 3H), 4.38-4.37 (m, 1H), 1.34 (d, J=6.5 Hz, 3H); $^{13}$C NMR (126 MHz, $CDCl_3$) δ 166.64, 165.27, 138.54, 138.03, 133.49, 133.08 (q, $^2$J=34.8 Hz), 129.60, 129.27, 128.82, 128.47, 128.14, 126.70, 125.27, 123.17 (q, $^1$J=263.5 Hz), 120.44, 89.59, 76.55, 72.17, 14.49. $^{19}$F (376 MHz, $CDCl_3$) δ −62.9; HRMS (ESI) for $C_{26}H_{23}F_6N_2O_4$(M+H$^+$): calcd 541.1478, found 541.1465.

Amy-1-4

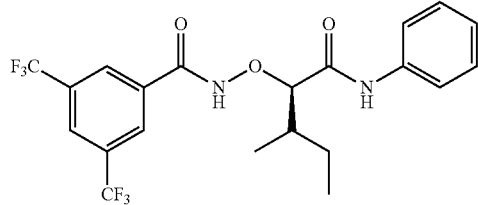

Compound Amy-1-4: $^{13}$C NMR (126 MHz, $CD_3OD$) δ 170.64, 165.13, 138.12, 134.27, 132.40 (q, $^2$J=33.9 Hz, 1C), 129.06, 128.23, 125.78, 124.85, 123.62 (q, $^1$J=269.14 Hz), 120.51, 90.17, 38.31, 26.30, 13.47, 11.35;

Amy-1-8

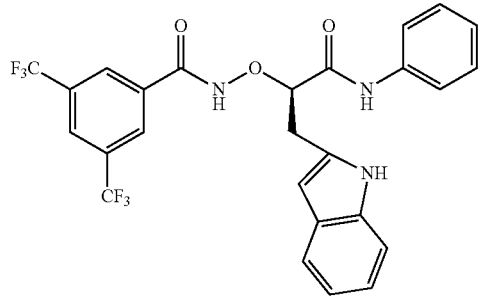

The starting material of compound Amy-1-8 was prepared according to the procedures described in H.-y. Zha in Design, synthesis and characterization of synthetic ion transporters, PhD The University of Hong Kong, Hong Kong, 2012. Following the same procedures described in scheme 7, compound Amy-1-8 was obtained as a white solid: $^1$H NMR (400 MHz, DMSO) δ 12.61 (s, 1H), 10.89 (s, 1H), 10.25 (s, 1H), 8.39 (s, 2H), 8.34 (s, 1H), 7.63-7.58 (m, 3H), 7.33-7.27 (m, 4H), 7.08-6.97 (m, 3H), 4.89-4.87 (m, 1H), 3.31-3.28 (m, 2H); $^{13}$C NMR (126 MHz, DMSO) δ 169.03, 162.90, 138.79, 136.48, 134.59, 131.01 (q, $^2J_{C,F}$=33.3 Hz), 129.16, 128.64, 127.87, 125.86, 124.38, 124.20, 123.44 (q, $^1J_{C,F}$= 273.1 Hz), 121.40, 119.99, 118.86, 118.83, 111.79, 109.13, 86.12, 27.47; $^{19}$F (376 MHz, $CDCl_3$) δ−61.4; HRMS (ESI) for $C_{26}H_{20}F_6N_3O_3$ (M+H$^+$): calcd 535.1325, found 536.1357.

sff-2-100

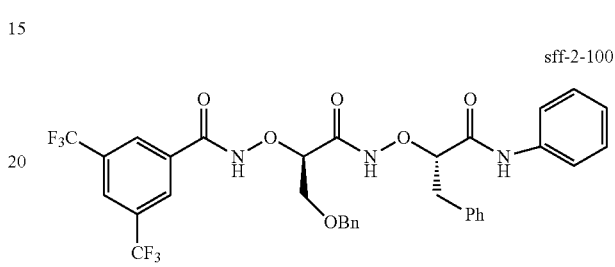

Following the procedures described in F.-F. Shen in Design and synthesis of α-aminoxy acid-based cation transporters and their applications as anti-cancer and antibacterial agents, PhD The University of Hong Kong, Hong Kong, 2018. Compound sff-2-100 was obtained as a white solid (73%): $^1$H NMR (400 MHz, $CDCl_3$) δ 11.22 (br, 1H), 10.00 (s, 1H), 9.76 (br, 1H), 8.08 (s, 2H), 8.01 (s, 1H), 7.64 (s, 1H), 7.62 (s, 1H), 7.30-7.26 (m, 12H), 7.10-7.06 (m, 1H), 4.62-4.52 (m, 4H), 4.03 (d, J=11.9 Hz, 1H), 3.92-3.87 (m, 1H), 3.42 (d, J=13.62 Hz, 1H), 3.11-3.05 (m, 1H); $^{13}$C NMR (125 MHz, $CD_3OD$) δ 172.0, 170.4, 169.0, 138.9, 138.8, 137.5, 134.8, 133.0 (q, $^2J_{C,F}$=33.2 Hz), 130.7, 129.7, 129.4, 129.3, 128.9, 128.7, 128.6, 127.8, 126.1, 125.6, 124.4 (q, $^1J_{C,F}$=272.3 Hz), 121.4, 88.3, 84.8, 74.5, 69.6, 38.8; $^{19}$F NMR (376.5 MHz, $CDCl_3$) δ−62.9; HRMS (ESI) for $C_{34}H_{30}F_6N_3O_6$(M+H$^+$): calcd 690.2033, found 690.2003.

Example 2. Fourteen compounds including sff-2-112, sff-3-85, sff-2-124, sff-2-132, sff-3-86, sff-3-87, sff-3-91, sff-3-98-2, sff-3-100, sff-3-101, Amy-1-4, Amy-1-8, sff-2-100 and FPM-1-87 (Examples 1, 2, 3, 4, 5, 6, 7, 8, 9, 10, 11, 12, 13 and 14) have shown toxicities to ovarian HEY A8 CSCs.

Materials and Methods:

Cell Cultures Human ovarian carcinoma cell lines HEY A8 and SKOV3 were gifts from Professor Alice Wong's group (The University of Hong Kong). Cells were grown in Dulbecco's Modified Eagle (DMEM) medium supplemented with 10% FBS and 1% penicillin/streptomycin at 37° C. in a humidified atmosphere containing κ% $CO_2$. Isolation and culture of spheres were performed in serum-free stem-cell-selective condition as described in literature Ip etl. *Oncogene* 2014, 5, 9133-9149. Briefly, 1-2 weeks after plating, non-adherent spherical clusters of cells could be observed and were separated from single cells by low speed centrifugation. After $8^{th}$ to $10^{th}$ passages, the non-adherent spherical clusters of cells appeared as distinct spheres. Using this selection condition, HEY A8 spheres (HEY A8 SP) or SKOV3 spheres (SKOV3 SP) could be enzymatically dissociated and reformed into spheres within 3 days under stem-cell-selective condition. To allow differentiation, dissociated sphere cells were plated on tissue culture plates in medium (MCDB 105:M199=1:1) supplemented with 10% FBS and 1% PS.

Toxicity Test

HEY A8 SP cells (5×10$^4$) were plated in triplicate in 10 mL serum-free MCDB105 medium in 100-mm Petri dish for 7 days to form spheres. Compound at the final concentration of 5 µM was added. The cells were further incubated at 37° C. for 48 h. After that cells were collected by centrifugation and the medium was removed. Then 100 µL CellTiter-Glo® Luminescent Cell Viability reagent was added into each tube, which was incubated for 10 min with shaking. After that, the reagent was transferred into 96-well plates and cell viability was measured using a microplate reader (Spectra-Max 340PC 384, Molecular Devices).

Results:

After screened a small library of aminoxy acid based compounds, 14 molecules including sff-2-112, sff-3-85, sff-2-124, sff-2-132, sff-3-86, sff-3-87, sff-3-91, sff-3-98-2, sff-3-100, sff-3-101, Amy-1-4, Amy-1-8, sff-2-100 and FPM-1-187 (Examples 1, 2, 3, 4, 5, 6, 7, 8, 9, 10, 11, 12, 13 and 14) significantly decreased the cell viability of HEY A8 CSCs (FIG. 1). Among them compounds sff-2-112, sff-2-132 and sff-2-100 have shown the highest toxicity.

Example 3. Compounds sff-2-112, sff-2-124, sff-2-132 and sff-2-100 can selectively induce the death of HEY A8 and SKOV3 CSCs than cancer cells.

Materials and Methods:

HEY A8 or SKOV3 cancer Cells were plated in triplicate in 0.1 mL full medium in 96-well plates for 24 h. After that, the medium was changed to the fresh prepared medium with various concentrations of compounds. Cells were incubated for another 48 h. Then the cell viability was measured by CellTiter-Glo® Luminescent Cell Viability reagent according to the manufacture's instruction. The luminescence at 550 nm was measured using a microplate reader (Spectra-Max 340PC 384, Molecular Devices).

HEY A8 SP cells or SKOV3 SP cells (5×10$^4$) were plated in triplicate in 10 mL serum-free MCDB105 medium in 100-mm Petri dish for 7 days to form spheres. Then drugs at different concentration were added. The cells were further incubated at 37° C. for 48 h. After that cells were collected by centrifugation and the medium was removed. Then 100 µL of CellTiter-Glo® Luminescent Cell Viability reagent was added into each tube, which was incubated for 10 min with shaking. After that, the reagent was transferred into 96-well plates and cell viability was measured using a microplate reader (SpectraMax 340PC 384, Molecular Devices).

Results:

As shown in FIG. 4, all the three compounds have shown selectivity towards ovarian cancer cells than CSCs. Especially, compound sff-2-132 ("Example 4"), which has shown the best selectivity. The IC$_{50}$ value of compound sff-2-132 ("Example 4"). towards HEY A8 CSCs was 1.0±0.9 µM, towards Hey A8 cancer cells was 52.9±1.9 µM, towards SKOV3 CSCs was 1.0±0.9 µM, towards SKOV3 cancer cells was 63.4±8.9 µM. Further investigations were focused on compounds sff-2-112 ("Example 1") and sff-2-132 ("Example 4").

Example 4. Compound sff-2-112 ("Example 1") or sff-2-132 ("Example 4") can decrease the population of CD133$^+$ cells Materials and Methods:

A suspension of HEY A8 cells at the concentration of 2.5×10$^4$ cells/mL in DMEM medium were seeded into 60-mm cell culture dishes. Cells were incubated at 37° C. in a humidified atmosphere containing 5% CO$_2$ for 24 h, followed by the addition of 4 mL fresh medium or medium containing Paclitaxel (100 nM), sff-2-112 (15 µM) or compound sff-2-132 (15 µM). Medium containing 0.1% DMSO was used as a negative control. After 3 days, the medium was removed and cells were washed with cold PBS twice, and then stained with PE-conjugated CD133 antibody according to the manufacture's instruction. The fluorescence was analyzed by flow cytometry.

Figure 5:
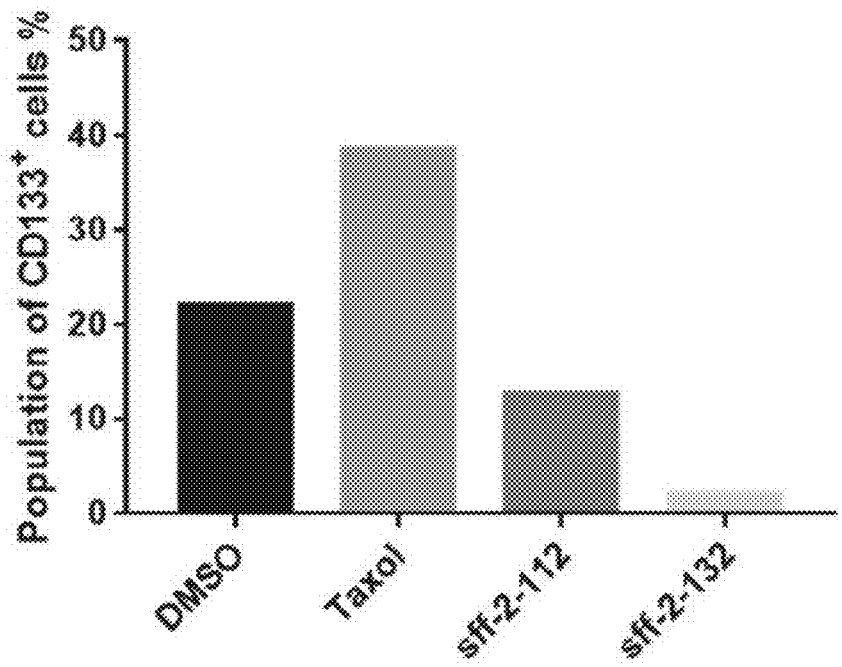
FIG. 5 is bar graph showing that compound sff-2-112 ("Example 1") or sff-2-132 ("Example 4") can decrease the population of cells with CD133 antigenic phenotype in adherent cells.

Results:

CD133 has been reported to be a cancer stem cell marker for ovarian cancer cells. To assess the specific influence of compound sff-2-112 ("Example 1") or sff-2-132 ("Example 4") on the population of CSCs, CD133 of HEY A8 cells were measured with the PE conjugated CD133 antibody (FIG. 5). Taxol at the final concentration of 10 nM was used as a negative control. After treatment with compound sff-2-112 ("Example 1"), the population of CD133+ cells was decreased from 21.8% to 12.6%; After treatment with compound sff-2-132 ("Example 4"), the population of CD133$^+$ cells within ovarian cancer cells was decreased from 21.8% to 1.9%, which is around 10-fold; in contrast, paclitaxel treatment increased the population of CD 133+ cells from 21.8% to 31.6%. These results confirmed that compound sff-2-112 ("Example 1") or sff-2-132 ("Example 4") can selectively decrease the population of HEY A8 CSCs.

Example 5: Compound sff-2-132 ("Example 4") can decrease spheroids formation

Materials and Methods:

Hey A8 cells were treated with compounds DMSO sff-2-112 ("Example 1") or sff-2-132 ("Example 4") at the concentration of 15 or 30 µM for 48 h. Then cells were allowed to recover and grow in full medium in cell culture dishes for 3 days. After that, cells at the density of 5×10$^4$ cells/mL were transferred into low attachment dishes for 5 days to allow sphere formation. The number of spheres in each dish were counted.

Results:

It is well known that spheroids formation in suspension culture condition are correlated with the population of CSCs. The effect of sff-2-112 ("Example 1") or sff-2-132 ("Example 4") on the ability of ovarian cancer HEY A8 cells to form spheroids in suspension culture was also evaluated. Compound sff-2-112 ("Example 1") or sff-2-132 ("Example 4") treatment resulted in a significant decrease in the number of spheres relative to controls (FIG. 6).

Example 6: sff-2-112 ("Example 1") or sff-2-132 ("Example 4") could decrease the tumor forming ability in vivo.

Materials and Methods:

In vivo tumor seeding ability of cells after treatment with compound sff-2-112 ("Example 1") or sff-2-132 ("Example 4") was evaluated. Taxol was used as a negative control. For this experiment, HEY A8 CSCs were pretreated with sff-2-112 ("Example 1"), sff-2-132 ("Example 4") or Taxol for 2 days in suspension medium, respectively. Then cells were allowed to proliferate in full medium in the absence of drugs for 10 days. After that, 10$^6$ cells were injected into mice subcutaneously. Tumor size was measured for 25 days after injection.

Results:

As shown in FIG. 7, compound sff-2-112 ("Example 1") or sff-2-132 ("Example 4") pretreatment resulted in significant decrease in tumor-seeding ability relative to taxol or DMSO pre-treatment. These findings indicated that CSCs within ovarian populations are resistant to paclitaxel but sensitive to the treatment of compound sff-2-112 ("Example 1") or sff-2-132 ("Example 4").

Example 7: Compound sff-2-112 ("Example 1") or sff-2-132 ("Example 4") could depolarize mitochondrial membrane potential.

Materials and Methods:

A suspension of HEY A8 cells at the concentration of $5\times10^4$ cells/mL in DMEM medium were seeded into 30-mm cell culture dishes with glass bottom (MatTek). Cells were incubated at 37° C. in a humidified atmosphere containing 5% $CO_2$ for 24 h. Medium was aspirated and cells was washed with PBS buffer twice. Then 1 mL HBSS buffer containing 2.5 µM JC-1 was added. Cells were incubated at 37° C. for 20 min before the buffer was aspirated. Cells were washed with PBS buffer twice and treated with cation transporters for 10 min. Fluorescence was monitored by confocal imaging with ZEISS LSM 780 (Red channel: $\lambda_{ex}$=543 nm, Green channel: $\lambda_{ex}$=488 nm). Quantitative data were obtained using the ZEN and Graph Pad Prism software packages.

Results:

As shown in FIG. 8a, compound sff-2-112 ("Example 1") or sff-2-132 ("Example 4") can effectively depolarize mitochondrial membrane potential (MMP) of HEY A8 cells in a dose dependent manner. The Kinetic study of this compound on the MMP in HEY A8 cells was also conducted. Compound sff-2-112 ("Example 1") or sff-2-132 ("Example 4") at the final concentration of 10 µM was added at 180 s. The interval for each image was 30 s. The decrease in red to green fluorescence ratio of JC-1 indicates MMP depolarization. From the results shown in FIG. 8b, MMP depolarized immediately upon addition of compound sff-2-112 ("Example 1") or sff-2-132 ("Example 4").

Example 8. Compound sff-2-112 ("Example 1") or sff-2-132 ("Example 4") could induce superoxide production in mitochondria.

Materials and Methods:

A suspension of HEY A8 cells at the concentration of $5\times10^4$ cells/mL in DMEM medium were seeded into 30-mm cell culture dishes with glass bottom (MatTek). Cells were incubated at 37° C. in a humidified atmosphere containing 5% $CO_2$ for 24 h. Medium was aspirated and cells was washed with PBS buffer twice. Then 1 mL HBSS buffer containing 4 µM HKSOX-2m was added. Cells were incubated at 37° C. for 30 min before the buffer was aspirated and washed twice with HBSS buffer. Cells were imaged in 0.8 mL HBSS buffer. Fluorescence was monitored by confocal microscope (ZEISS LSM 710; Red channel: $\lambda_{ex}$=543 nm). At t=180 s, compound in 0.2 mL HBSS buffer was added to give the final concentration of 5 µM. Quantitative data were obtained using the ZEN and GraphPad Prism software.

Results:

Within 30 min, about 2-fold increasement of superoxide production was detected for compound sff-2-112 ("Example 1") or sff-2-132 ("Example 4").

Example 9. Compound sff-2-112 ("Example 1") or sff-2-132 ("Example 4") could affect cell respiration.

Materials and Methods:

Cell respiration was measured by using an XF24 Extracellular Flux Analyzer (Seahorse, Bioscience), which measures the oxygen consumption rate (OCR). Adherent Hey A8 cells were seeded at 50000 cells/well in 200 mL of their culture medium and incubated for 24 h at 37° C. in humidified atmosphere with 5% $CO_2$. The medium was then replaced with 670 µL/well of high-glucose DMEM without serum and supplemented with 1 mM sodium pyruvate and 2 mM L-glutamine. The oxygen consumption rate (OCR) was measured with an extracellular flux analyzer (Seahorse) at preset time intervals upon the preprogrammed additions of the following compounds: Oligomycin to 1 µM, FCCP to 500 nM, Antimycin A and Rotenone to 0.5 µM final concentrations.

Results:

After addition of compound sff-2-112 ("Example 1") or compound sff-2-132 ("Example 4"), OCR immediately increased. But later, cell respiration response to the subsequent addition of FCCP, anitimycin A and rotenone was significantly decreased (FIG. 10). These results indicated the respiration chain was affected by both compounds. These effects were more obvious when higher doses of the synthetic molecules were added.

Example 10. Compound sff-2-112 ("Example 1") or sff-2-132 ("Example 4") could induce cell apoptosis Materials and Methods:

A suspension of HEY A8 cells at the concentration of $5\times10^4$ cells/mL in DMEM medium were seeded into 60-mm cell culture dishes. Cells were incubated at 37° C. in a humidified atmosphere containing 5% $CO_2$ for 24 h followed by the addition of 4 mL fresh medium or medium containing compound sff-2-112 ("Example 1") or sff-2-132 ("Example 4") at different concentration. Medium containing 0.1% DMSO was used as negative control. After 2 days, the medium was aspirated and cells were washed with cold PBS twice, and then stained with PI and Annexin V according to the manufacture's instruction (Dead Cell Apoptosis Kit with Annexin V Alexa Fluor™ 488 & Propidium Iodide, Thermo Fisher). Cells were analyzed by flow cytometry (BD FACS CantoII Analyzer).

For immunostaining experiment, cells were treated with compound sff-2-112 ("Example 1") or compound sff-2-132 ("Example 4") at different concentration for 48 h, then washed twice with PBS buffer and lysed with 2×SDS buffer with 0.1% Benzonase. Protein extracts were quantified by Pierce BCA Protein Assay Kit with a Nanodrop 2000 (Thermo Fisher Scientific) according to the manufacture's instruction. Protein lysates (~50 µg/lane) were resolved by SDS-PAGE and transferred onto PVDF membranes. Membranes were incubated with membrane blocking solution (Thermo Fisher Scientific) for 1 h. The blots were then probed with the relevant primary antibodies in blocking solution at 4° C. overnight with gentle agitation. Membranes were washed with 0.1% Tween 20/TBS for 5 min three times and were incubated with Horseradish Peroxidase (HRP) conjugated secondary antibodies for 1 h at room temperature. Antigens were detected by SuperSignal West Pico PLUS Chemiluminescent Substrate (Thermo Fisher Scientific). Imaging was performed using a ChemiDoc™ XRS+ System (Bio-Rad).

Results:

As shown in FIG. 11a that DMSO treatment of CSCs alone produced 4.92% Annexin V positive cells; Compound sff-2-112 ("Example 1") treatment at 5 µM produced 21.0% Annexin V positive cells, Compound sff-2-132 ("Example 4") treatment at 5 µM produced 30.4% Annexin V positive cells; For cancer cells, DMSO treatment alone produced 1.73% Annexin V positive cells; Compound sff-2-112 ("Example 1") treatment at 30 µM produced 8.21% Annexin V positive cells; Compound sff-2-132 ("Example 4") treatment at 30 µM produced 1.30% Annexin V positive cells. Although the concentration of compounds to CSCs were 6-fold lower than that to cancer cells, the apoptotic cell population of CSCs treated with compound sff-2-112 ("Example 1") or sff-2-132 ("Example 4") was much higher than that of cancer cells.

The activation of protein PARP1, Caspase 3 and Caspase 9 was also observed in CSCs even when the concentration of compounds were 10-fold lower than that of cancer cells (FIG. 11b). These results further demonstrated the highly selectivity of compound sff-2-112 ("Example 1") or sff-2-132 ("Example 4") to ovarian CSCs.

Example 11. Compound sff-2-112 ("Example 1") or sff-2-132 ("Example 4") could suppress cell autophagy Materials and Methods:

HEY A8 cancer cells and CSCs were treated with compound sff-2-112 ("Example 1") or sff-2-132 ("Example 4") for 24 h. Then cells were washed twice with PBS buffer and lysed for immuno-staining. The immunostaining methods were as same as it described in Example 10.

Results:

Increased levels of both LC3-II and p62 in CSCs indicated autophagy suppression. The effects were more obvious in CSCs even when the concentration of compound sff-2-112 ("Example 1") or sff-2-132 ("Example 4") was 10-fold lower than that of cancer cells.

Example 12. Compound sff-2-112 ("Example 1") or sff-2-132 ("Example 4") could induce the death of liver cancer Huh 7 cells and CSCs Materials and Methods:

Huh-7 cells were stained with PE-conjugated CD133 antibody (HCC cancer stem cell marker) according to the manufacturer's instructions. Then CD133+ cells (Huh 7 cancer stem cells) and CD133− cells were sorted by flow cytometry and seeded into 96-well plate with fresh DMEM medium. After 24 h, medium was changed to fresh medium with compound sff-2-112 ("Example 1") or sff-2-124 ("Example 3") at different doses. After 48 h, cell viability was analyzed by CellTiter-Glo luminescent agent.

Results:

Compound sff-2-112 ("Example 1") or sff-2-124 ("Example 3") can induce the death of both CD133− and CD133+ cells. For compound sff-2-124, its toxicity to huh7 cancer stem cells (CD133+ population) was higher than that to CD133− cells.

The foregoing description of the specific embodiments will so fully reveal the general nature of the disclosure that others can, by applying knowledge within the skill of the relevant art(s) (including the contents of the documents cited and incorporated by reference herein), readily modify and/or adapt for various applications such specific embodiments, without undue experimentation, without departing from the general concept of the present disclosure. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present disclosure have been described above, it should be understood that they have been presented by way of examples, and not limitation. It would be apparent to one skilled in the relevant art(s) that various changes in form and detail could be made therein without departing from the spirit and scope of the disclosure. Thus, the present disclosure should not be limited by any of the above-described exemplary embodiments, but should be defined only in accordance with the following claims and their equivalents.

The invention claimed is:

1. A cell death inducing compound selected from the group consisting of:

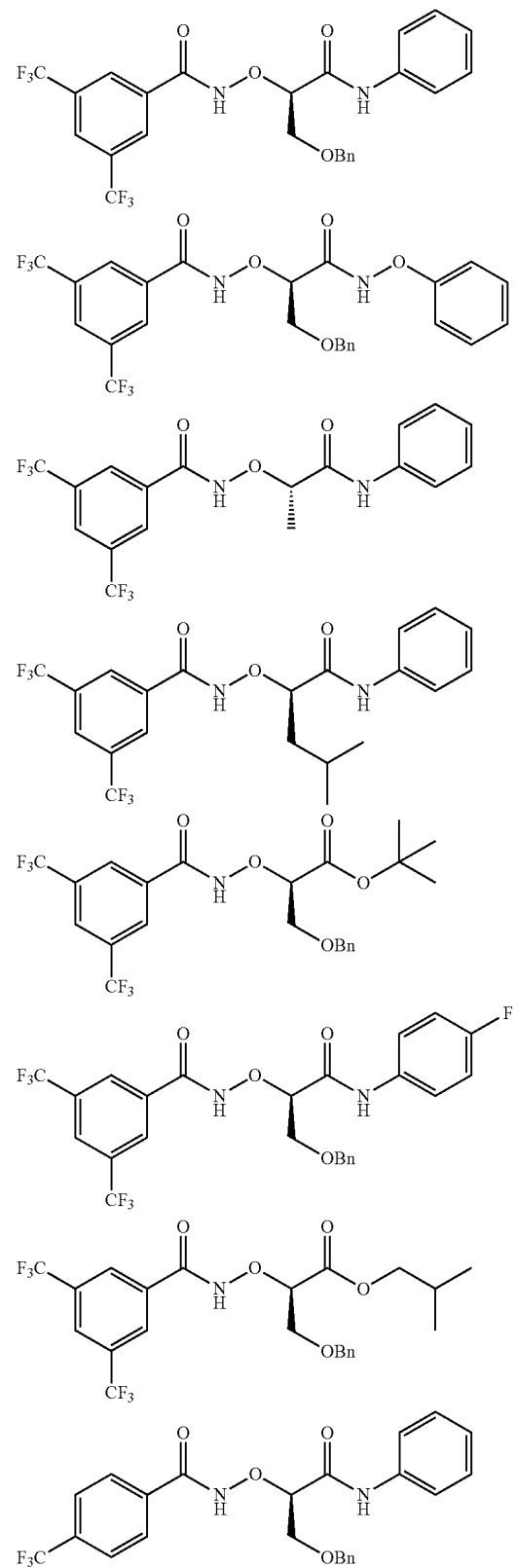

-continued

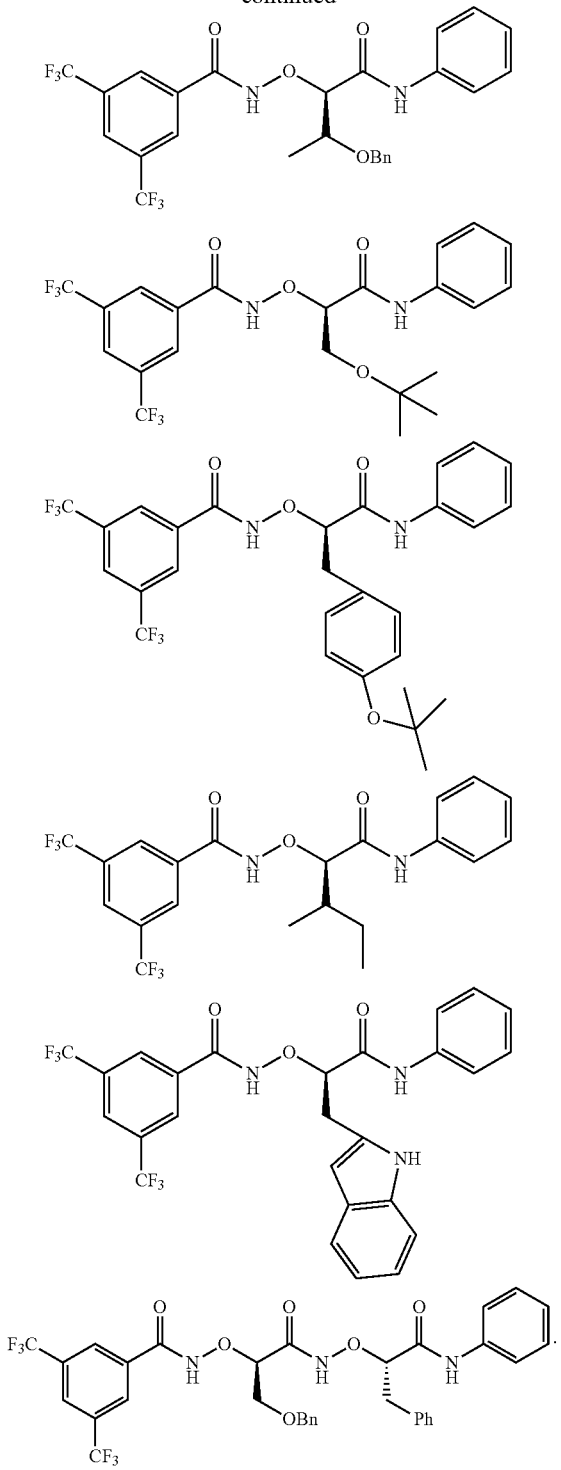

2. A method for the treatment of ovarian cancer, comprising administrating the compound according to claim 1 to a subject in need of the treatment.

3. The method according to claim 2, wherein the treatment of ovarian cancer is achieved by inhibiting cancer stem cells.

4. The method according to claim 3, wherein the cancer stem cells are ovarian cancer stem cells.

5. A pharmaceutical composition comprising at least a compound according to claim 1, a pharmaceutically acceptable salt, solvate or hydrate thereof, and at least one pharmaceutically acceptable excipient.

6. The pharmaceutical composition according to claim 5, comprising a compound selected from:

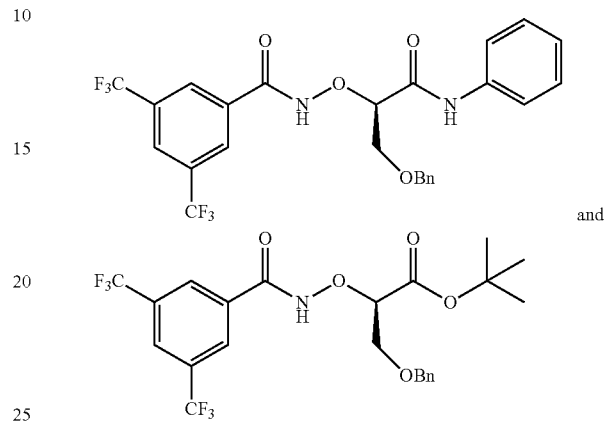

a pharmaceutically acceptable salt, solvate or hydrate thereof, and at least one pharmaceutically acceptable excipient.

7. A method for the treatment of liver cancer, comprising administering the compound selected from the group consisting of:

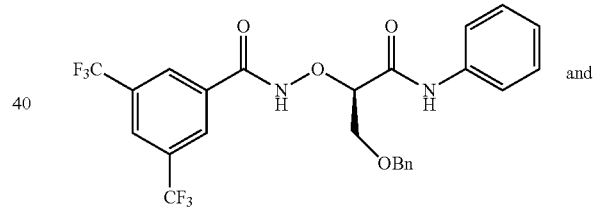

(sff-2-112)

Example 3

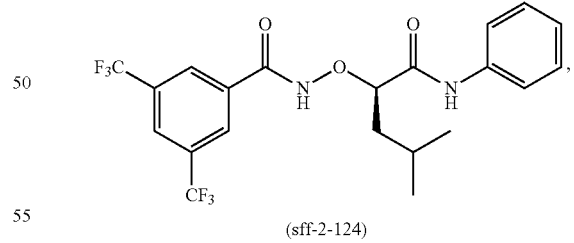

(sff-2-124)

to a subject in need of the treatment.

8. The method according to claim 7, wherein the treatment of liver cancer is achieved by inhibiting cancer stem cells.

9. The method according to claim 8, wherein the cancer stem cells are liver cancer stem cells.

* * * * *